(12) United States Patent
Hsu

(10) Patent No.: US 9,342,101 B2
(45) Date of Patent: May 17, 2016

(54) BIAXIAL PIVOT MECHANISM AND PORTABLE ELECTRONIC DEVICE THEREOF

(71) Applicant: Wistron Corporation, New Taipei (TW)

(72) Inventor: Wen-Chi Hsu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

(21) Appl. No.: 14/154,195

(22) Filed: Jan. 14, 2014

(65) Prior Publication Data

US 2014/0360296 A1 Dec. 11, 2014

(30) Foreign Application Priority Data

Jun. 5, 2013 (TW) .............................. 102119962 A
Oct. 3, 2013 (TW) .............................. 102135912 A

(51) Int. Cl.
*G06F 1/16* (2006.01)

(52) U.S. Cl.
CPC ............ *G06F 1/1616* (2013.01); *G06F 1/1618* (2013.01); *G06F 1/1679* (2013.01); *G06F 1/1681* (2013.01); *Y10T 16/541* (2015.01); *Y10T 74/1888* (2015.01)

(58) Field of Classification Search
CPC ............ Y10T 16/154; Y10T 16/53864; Y10T 16/547; Y10T 74/1888; F16H 19/08; G06F 1/1616; G06F 1/1681; G06F 1/1683; G06F 1/1618; G06F 1/1679; H04M 1/022; E05D 3/122; E05D 11/0081; E05Y 2900/606; H05K 5/0226

USPC ............ 16/354, 302, 366; 74/98; 361/679.27; 439/31, 165; 379/433.13; 455/575.3
See application file for complete search history.

(56) References Cited

U.S. PATENT DOCUMENTS 7,447,007 B2 * 11/2008 Jeun et al. ................ 361/679.55
7,647,020 B2   1/2010 Chuang
(Continued)

FOREIGN PATENT DOCUMENTS

CN        202402461 U       8/2012

OTHER PUBLICATIONS

Office action mailed on Aug. 28, 2015 for the Taiwan apllication No. 102135912, filing date: Oct. 3, 2013, p. 1 line 14, p. 2-4 and p. 5 line 1-24.

(Continued)

*Primary Examiner* — William Miller
(74) *Attorney, Agent, or Firm* — Winston Hsu; Scott Margo

(57) ABSTRACT

A biaxial pivoting mechanism for rotating a first casing relative to a second casing is disclosed in the present disclosure. The biaxial pivoting mechanism includes at least one fixing component, a first shaft, a first main gear, a second shaft, a second main gear and a transmission gear set. The fixing component includes a first area and a second area. The first shaft and the second shaft are disposed on the first area and the second area and further connected to the first casing and the second casing respectively. The first main gear and the second main gear are respectively disposed on the first shaft and the second shaft. The transmission gear set is engaged with the first main gear and the second main gear. As the first main gear rotates at a first direction, the second main gear synchronously rotates at a second direction opposite to the first direction.

34 Claims, 21 Drawing Sheets

(56) References Cited

U.S. PATENT DOCUMENTS

| | | |
|---|---|---|
| 8,032,988 B2 | 10/2011 | Lai |
| 8,104,144 B2* | 1/2012 | Wang et al. ............ 16/354 |
| 8,474,101 B2* | 7/2013 | Wang et al. ............ 16/366 |
| 8,615,848 B2* | 12/2013 | Mitsui ................... 16/366 |
| 2004/0266239 A1* | 12/2004 | Kurokawa ............. 439/165 |
| 2007/0226955 A1 | 10/2007 | Cho et al. |
| 2008/0109995 A1* | 5/2008 | Kuwajima et al. ..... 16/354 |
| 2008/0256751 A1* | 10/2008 | Hirose ............... G06F 1/162 16/366 |
| 2009/0013500 A1* | 1/2009 | Ueyama et al. ........ 16/354 |
| 2009/0070961 A1* | 3/2009 | Chung et al. .......... 16/354 |
| 2011/0271486 A1* | 11/2011 | Wang et al. ........... 16/319 |
| 2013/0139355 A1* | 6/2013 | Lee et al. .............. 16/354 |
| 2013/0322004 A1* | 12/2013 | Park .................. 361/679.27 |
| 2014/0251045 A1* | 9/2014 | Hsu ....................... 74/96 |

OTHER PUBLICATIONS

Office action mailed on Jan. 11, 2016 for the Taiwan application number 102135912, filing date: Oct. 3, 2013, p. 2 line 17~26 and p. 3 line 1~19.

* cited by examiner

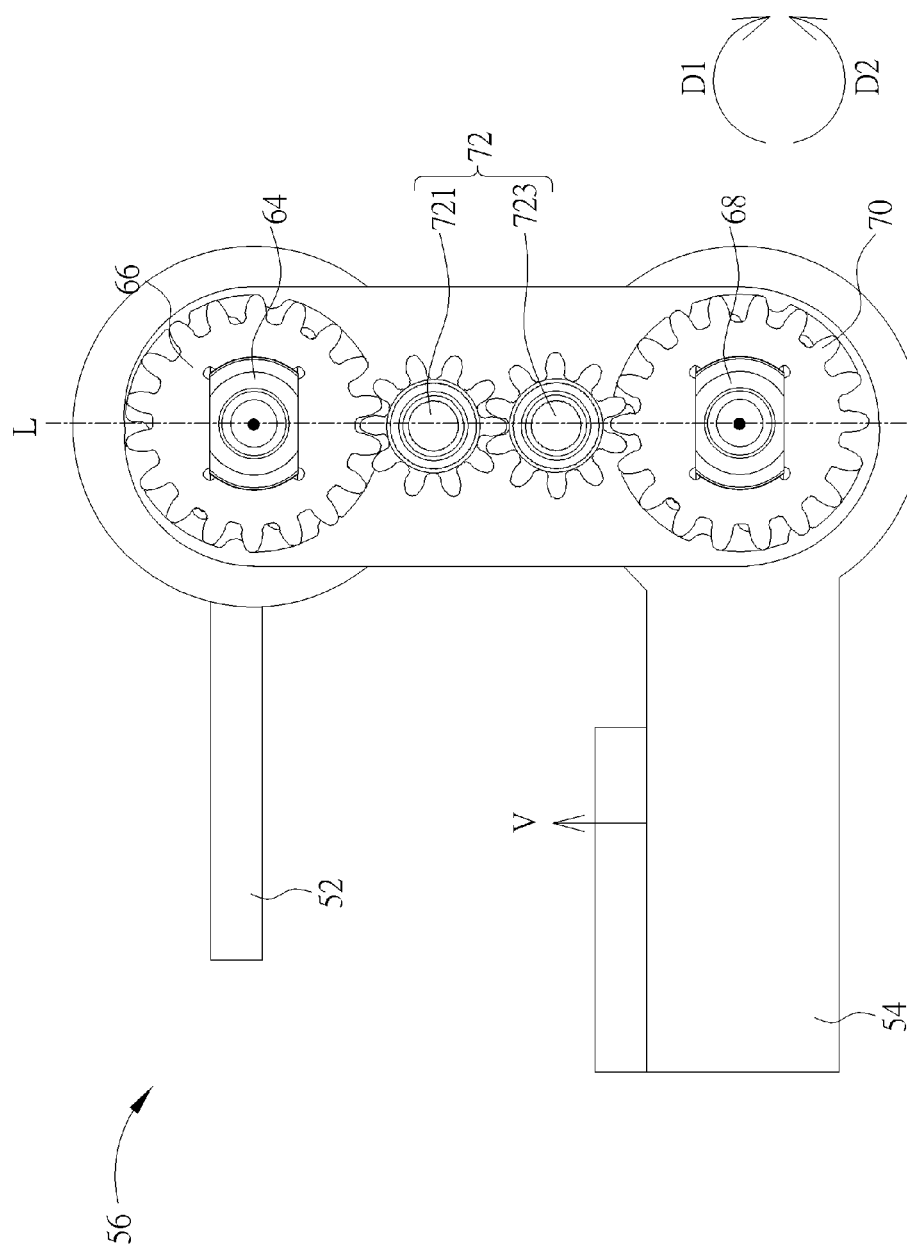

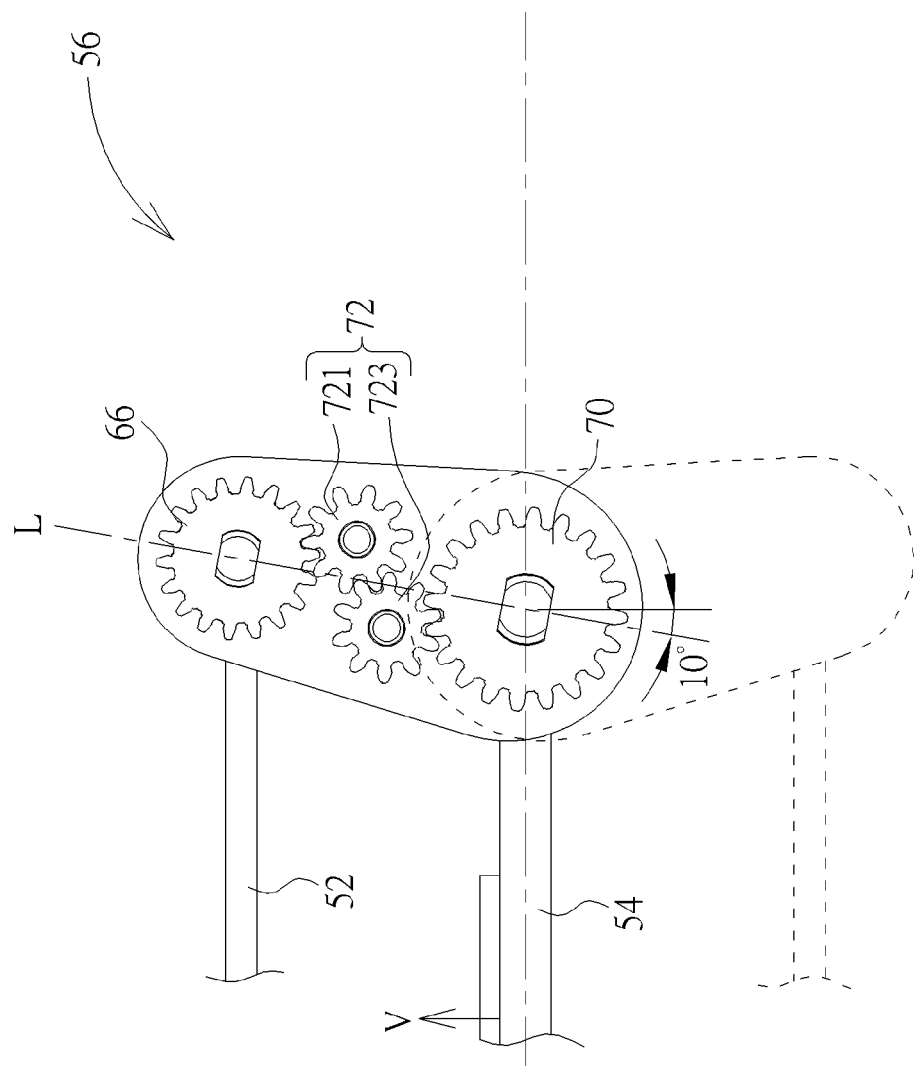

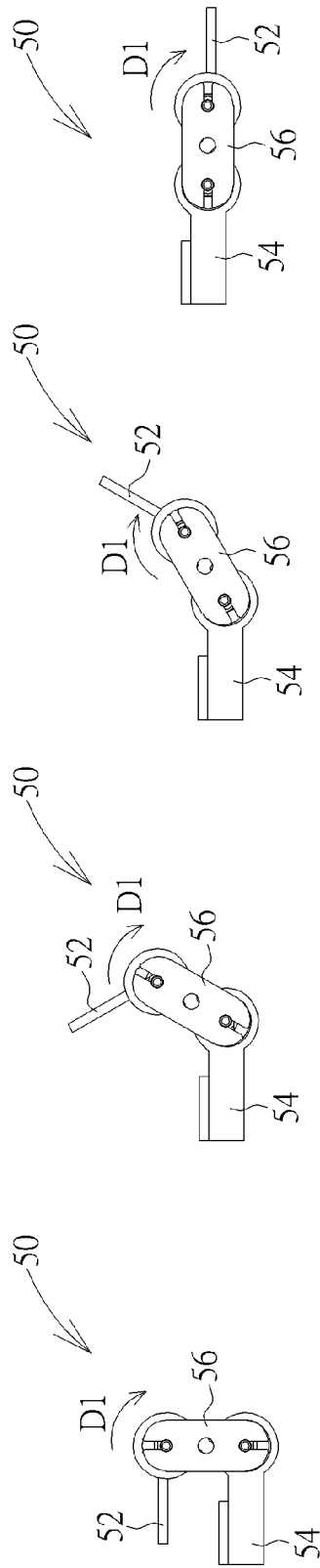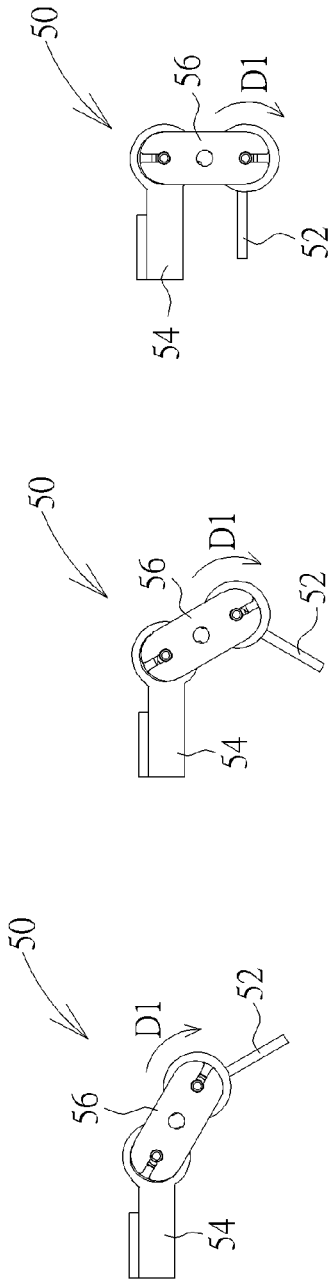
FIG. 13A  FIG. 13B  FIG. 13C  FIG. 13D
FIG. 13E  FIG. 13F  FIG. 13G

BIAXIAL PIVOT MECHANISM AND PORTABLE ELECTRONIC DEVICE THEREOF

BACKGROUND OF THE INVENTION

1. Field of the Invention

The present disclosure relates to a biaxial pivot mechanism and a related portable electronic device, and more particularly, to a biaxial pivot mechanism and a related portable electronic device with advantages of 360-degree rotation, low manufacturing cost and preferred aesthetic.

2. Description of the Prior Art

A conventional notebook computer utilizes the pivot mechanism to rotate the screen relative to the host. Please refer to FIG. 1. FIG. 1 is a diagram of a pivot mechanism 10 in the prior art. The pivot mechanism 10 includes a first cam 12, a second cam 14 and a bridge roller 16. The first cam 12 and the second cam 14 are respectively connected to a screen 18 and a host 20 of the electronic device. As shown in FIG. 1, when the screen 18 is unfolded relative to the host 20, the first cam 12 rotates at a clockwise direction, and the second cam 14 is static. As the first cam 12 rotates to 180 degrees and the sunken portion 121 of the first cam 12 is engaged with the bridge roller 16, the bridge roller is separated from the sunken portion 141 of the second cam 14, and the pivot mechanism 10 can rotate relative to the host 20 at the clockwise direction. Because the cams of the pivot mechanism 10 independently rotate at different operating processes, a torque exists between the screen 18 and the host 20, and the pivot mechanism 10 disposes the torsional components with sufficient torque respectively on the first cam 12 and the second cam 14. Thus, the shaft of the conventional pivot mechanism is damaged easily by the large torque, the manufacturing cost is increased and the service life is decreased.

Please refer to FIG. 2. FIG. 2 is a diagram of the other pivot mechanism 30 in the prior art. The pivot mechanism 30 includes a first gear 32 and a second gear 34. The first gear 32 is connected to the screen 36, the second gear 34 is connected to the host 38, and the first gear 32 is directly engaged with the second gear 34. When the screen 36 is unfolded relative to the host 38, the screen 36 drives the first gear 32 to rotate at the clockwise direction, and the first gear 32 drives the second gear 34 to rotate at the counterclockwise direction. Further, when the screen 36 is folded over the host 38, the first gear 32 rotates at the counterclockwise direction, and the second gear 34 is driven by the first gear 32 to rotate at the clockwise direction. Dimensions of gears of the pivot mechanism 30 directly correspond to the structural heights of the screen 36 and the host 38 because the first gear 32 is directly engaged with the second gear 34. For example, the pivot mechanism 30 utilizes the large gear as the notebook computer is large size; the pivot mechanism 30 utilizes the small gear as the notebook computer is thin-typed. Therefore, volume of the pivot mechanism 30 is varied according to dimensions of the used gear for different notebook computers. The conventional pivot mechanism is designed and manufactured according to types of the notebook computer, and has drawbacks of expensive cost and inconvenient assembly.

SUMMARY OF THE INVENTION

The present disclosure provides a biaxial pivot mechanism and a related portable electronic device with advantages of 360-degree rotation, low manufacturing cost and preferred aesthetic for solving above drawbacks.

According to the claimed disclosure, a biaxial pivot mechanism for rotating a first casing relative to a second casing is disclosed. The biaxial pivot mechanism includes at least one fixing component, a first shaft, a first main gear, a second shaft, a second main gear and a transmission gear set. The fixing component includes a first area and a second area. The first shaft is disposed on the first area of the fixing component and connected to the first casing. The first main gear is disposed on the first shaft in a coaxially rotary manner. The second shaft is disposed on the second area of the fixing component and connected to the second casing. The second main gear is disposed on the second shaft in the coaxially rotary manner. The transmission gear set is engaged between the first main gear and the second main gear. As the first main gear rotates at a first direction, the transmission gear set is driven by the first main gear to synchronously rotate the second main gear at a second direction opposite to the first direction.

According to the claimed disclosure, the biaxial pivot mechanism further includes a first supporter and a second supporter. The first supporter is disposed on the first shaft and fixed to the first casing. The second supporter is disposed on the second shaft and fixed to the second casing.

According to the claimed disclosure, the transmission gear set includes a first transmission gear and a second transmission gear. The first transmission gear is engaged with the first main gear and the second transmission gear, the second transmission gear is engaged with the second main gear and the first transmission gear.

According to the claimed disclosure, the first transmission gear rotates at the second direction and the second transmission gear rotates at the first direction when the first main gear rotates at the first direction.

According to the claimed disclosure, the biaxial pivot mechanism further includes a plurality of torsional components, a constraint component and a plurality of buffers. The plurality of torsional components is disposed on the first shaft. The constraint component is disposed on the first shaft to press the plurality of torsional components. The plurality of buffers is disposed between the first main gear and the fixing component, between the torsional component and the fixing component, and between the torsional component and the constraint component.

According to the claimed disclosure, a tooth number of the first main gear is substantially greater than 12, a module of the first main gear is substantially greater than 0.2 mm, and the tooth number multiplied by the module is a pitch circle diameter of the first main gear.

According to the claimed disclosure, a tooth number of the first transmission gear is substantially greater than 8, and a module of the first transmission gear is substantially greater than 0.2 mm.

According to the claimed disclosure, a tooth crown of the first main gear is substantially greater than 0.2 mm, the pitch circle diameter and the twice tooth crown of the first main gear are added up to equal an outer diameter of the first main gear.

According to the claimed disclosure, the tooth number divided by the pitch circle diameter equals a diametral pitch of the first main gear.

According to the claimed disclosure, the tooth crown of the first main gear is substantially greater than 0.2 mm, and the tooth crown is a reciprocal value of the diametral pitch.

According to the claimed disclosure, a portable electronic device includes a first casing, a second casing and a biaxial pivot mechanism. The first casing is rotatably disposed on the second casing. The biaxial pivot mechanism is disposed between the first casing and the second casing for rotating the first casing relative to the second casing. The biaxial pivot mechanism includes at least one fixing component, a first shaft, a first main gear, a second shaft, a second main gear and a transmission gear set. The fixing component includes a first area and a second area. The first shaft is disposed on the first area of the fixing component and connected to the first casing. The first main gear is disposed on the first shaft in a coaxially rotary manner. The second shaft is disposed on the second area of the fixing component and connected to the second casing. The second main gear is disposed on the second shaft in the coaxially rotary manner. The transmission gear set is engaged between the first main gear and the second main gear. As the first main gear rotates at a first direction, the transmission gear set is driven by the first main gear to synchronously rotate the second main gear at a second direction opposite to the first direction.

According to the claimed disclosure, when the first casing rotates relative to the biaxial pivot mechanism at a predetermined direction, the biaxial pivot mechanism synchronously rotates the first casing relative to the second casing at the predetermined direction.

According to the claimed disclosure, the portable electronic device further includes a connective cable and a protective component. Two ends of the connective cable are electrically connected to the first casing and the second casing respectively. The connective cable passes through a gap between the biaxial pivot mechanism and the first casing. The protective component is disposed on the biaxial pivot mechanism and the connective cable.

According to the claimed disclosure, a gear ratio of the first main gear to the second main gear is 1, a center line between the first main gear and the second main gear is substantially parallel to a normal vector of the second casing.

According to the claimed disclosure, the gear ratio of the first main gear to the second main gear is 0.8, an angle of a center line between the first main gear and the second main gear relative to a normal vector of the second casing is substantially 10 degrees.

According to the claimed disclosure, the gear ratio of the first main gear to the second main gear is 0.6, an angle of a center line between the first main gear and the second main gear relative to a normal vector of the second casing is substantially 22.5 degrees.

According to the claimed disclosure, the gear ratio of the first main gear to the second main gear is 0.5, an angle of a center line between the first main gear and the second main gear relative to a normal vector of the second casing is 30 degrees.

According to the claimed disclosure, the gear ratio of the first main gear to the second main gear is 0.92, an angle of a center line between the first main gear and the second main gear relative to a normal vector of the second casing is substantially 3.75 degrees.

According to the claimed disclosure, the portable electronic device further includes a magnetic sensor disposed on the first casing or the second casing. The biaxial pivot mechanism further includes a magnetic component disposed on the fixing component and adjacent to the magnetic sensor. Relative position of the magnetic component and the magnetic sensor is varied by rotation of the first casing, and the magnetic sensor is utilized to induce magnetic flux intensity generated from the magnetic component and outputs a switching signal according to the magnetic flux intensity.

According to the claimed disclosure, an automatic rotary function of a display surface of the second casing is shut down and an operational function of an input interface of the second casing is actuated by the switching signal when the magnetic sensor determines the magnetic flux intensity is greater than a threshold. The automatic rotary function of the display surface is actuated and the operational function of the input interface is shut down by the switching signal when the magnetic sensor determines the magnetic flux intensity is smaller than the threshold.

According to the claimed disclosure, the magnetic component includes a first pole and a second pole opposite to each other. The magnetic component rotates relative to the magnetic sensor via the second pole to vary relative distance between the first pole and the magnetic sensor.

According to the claimed disclosure, the magnetic component includes a first pole and a second pole opposite to each other. The magnetic component rotates via a boundary between the first pole and the second pole, and the magnetic flux intensity induced by the magnetic sensor is varied according to rotary angle of the magnetic component.

The torsional spring with full torque is unnecessary in the present disclosure, the biaxial pivot mechanism of the present disclosure uniformly distributes the torque over the first shaft and the second shaft, which means the first shaft and the second shaft respectively includes the torsional component with half torque, to effectively prevent the biaxial pivot mechanism from damage due to intolerable force. Furthermore, the present disclosure can be applied to the portable electronic device with any dimension. The gears of the biaxial pivot mechanism are standard mode, dimension of the gears are not varied according to volume of the portable electronic device, and the biaxial pivot mechanism can keep the preferred aesthetic. The present disclosure disposes the plurality of transmission gears between the main gears of the biaxial pivot mechanism, the position variation of the transmission gears, such as the interlaced arrangement and the linear arrangement, can be utilized to conveniently adjust the structural height of the biaxial pivot mechanism, so that the biaxial pivot mechanism is suitable for any types of portable electronic device. Distance between the magnetic component and the magnetic sensor is varied by rotation of the biaxial pivot mechanism. The magnetic sensor is switched between the release point and the operation point according to variation of the magnetic influx intensity, so as to automatically switch the notebook computer mode and the touch panel mode of the portable electronic device. The biaxial pivot mechanism and the portable electronic device of the present disclosure has advantages of easy assembly, low manufacturing cost, long service life and smooth operation.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 8A and FIG. 8B are inner structural diagrams of the biaxial pivot mechanism 56 according to different embodiments of the present disclosure.

FIG. 9A and FIG. 9B are partly structural diagrams of the biaxial pivot mechanism according to the other embodiment of the present disclosure.

FIG. 13A to FIG. 13G are diagrams of the portable electronic device at different operation modes according to the embodiment of the present disclosure.

DETAILED DESCRIPTION

Figure 1:
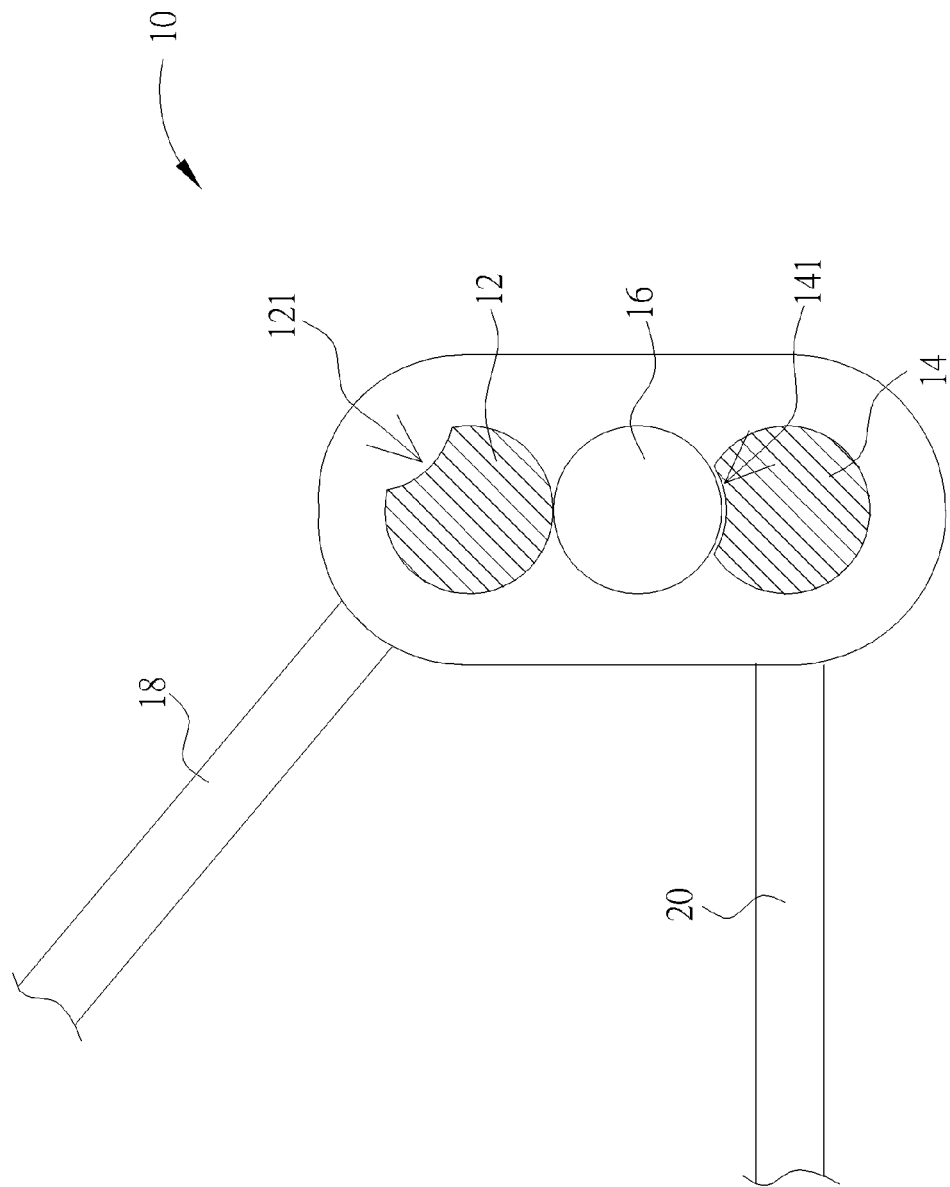
FIG. 1 is a diagram of a pivot mechanism in the prior art.
Figure 2:
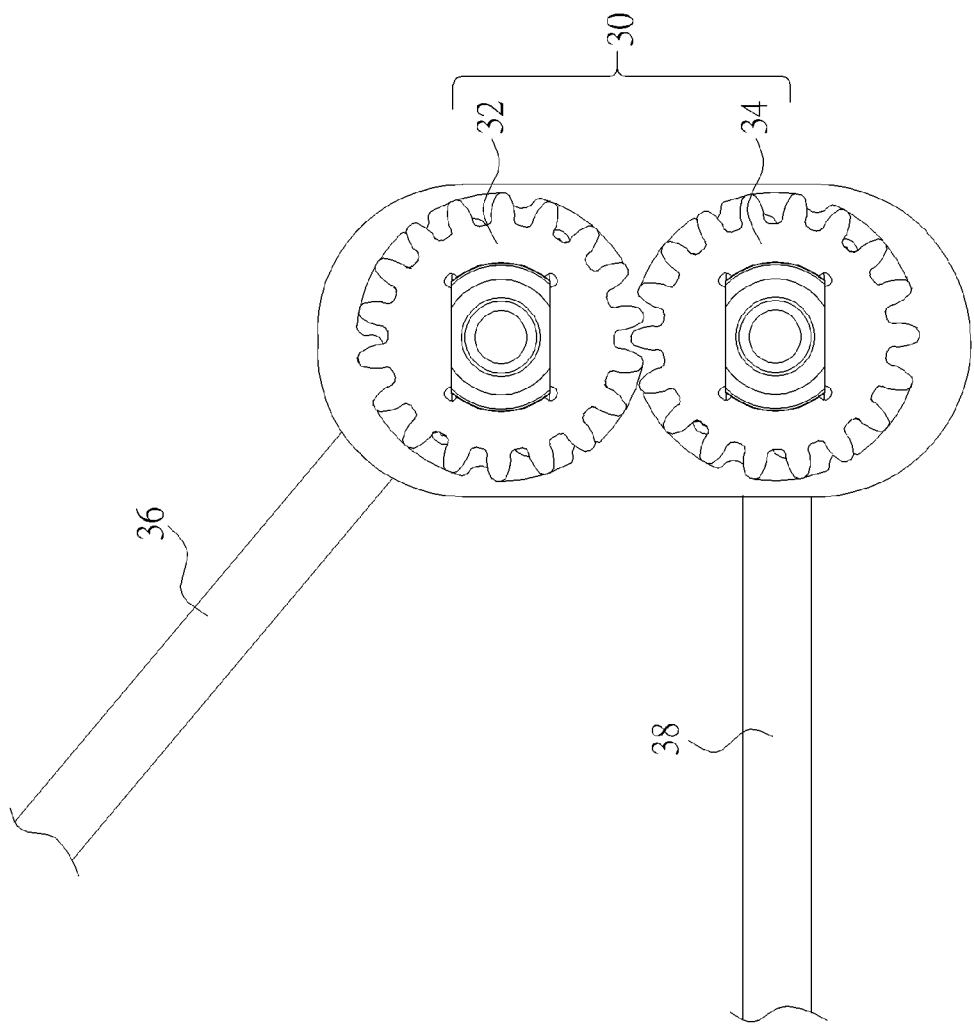
FIG. 2 is a diagram of the other pivot mechanism in the prior art.
Figure 3:
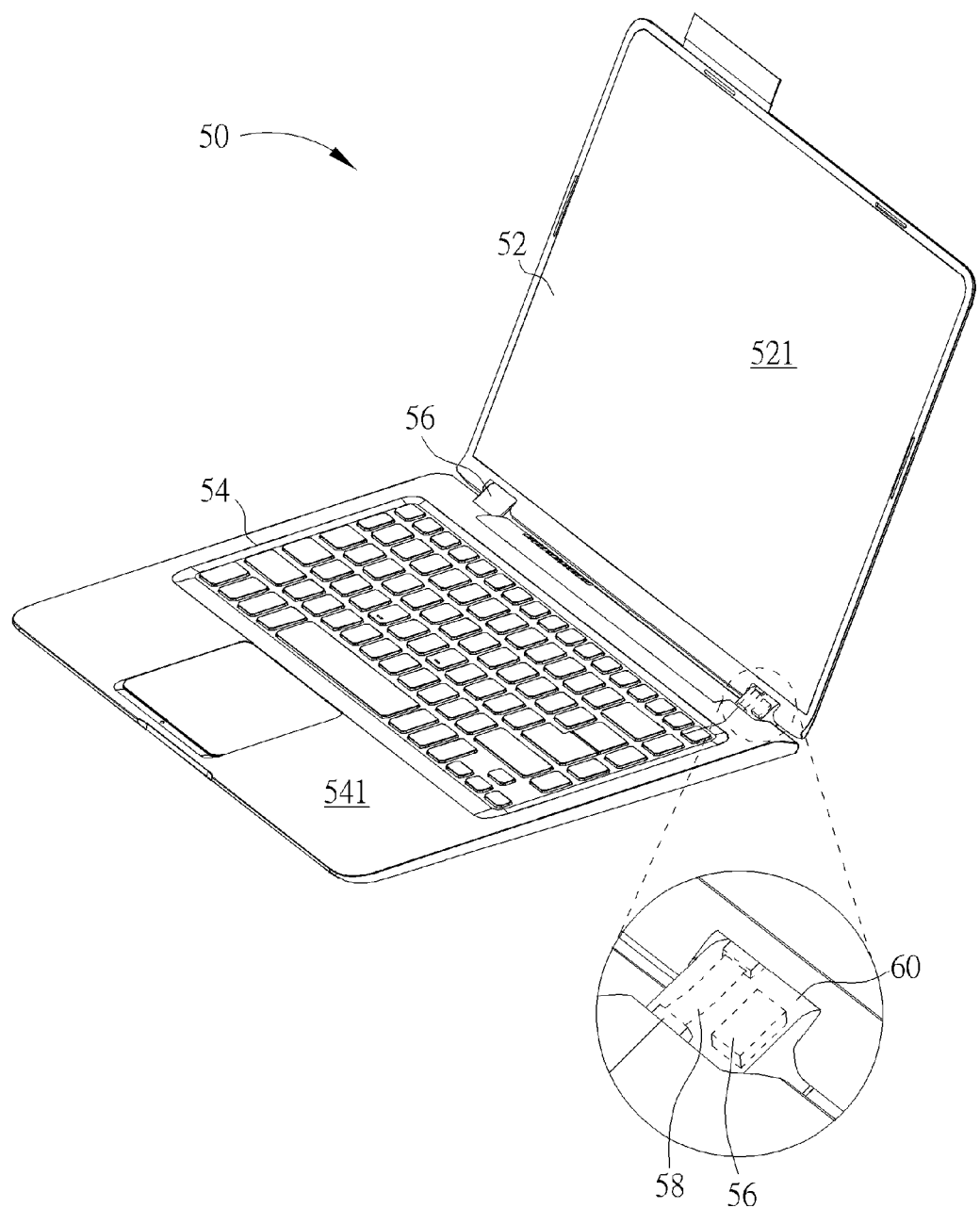
FIG. 3 is a diagram of a portable electronic device according to an embodiment of the present disclosure.
Figure 4:
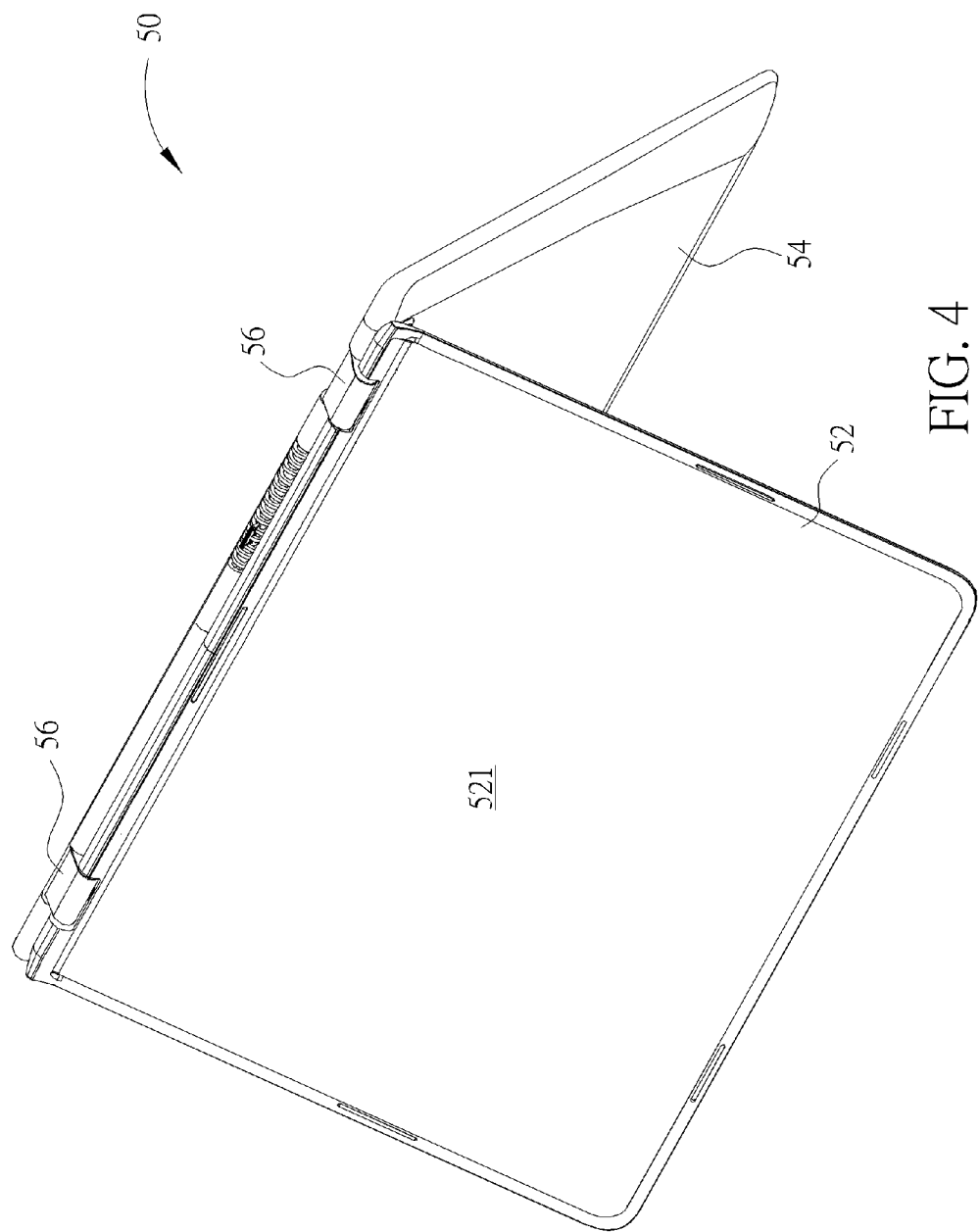
FIG. 4 and FIG. 5 respectively are diagrams of the portable electronic device at different operation modes according to the embodiment of the present disclosure.
Figure 5:
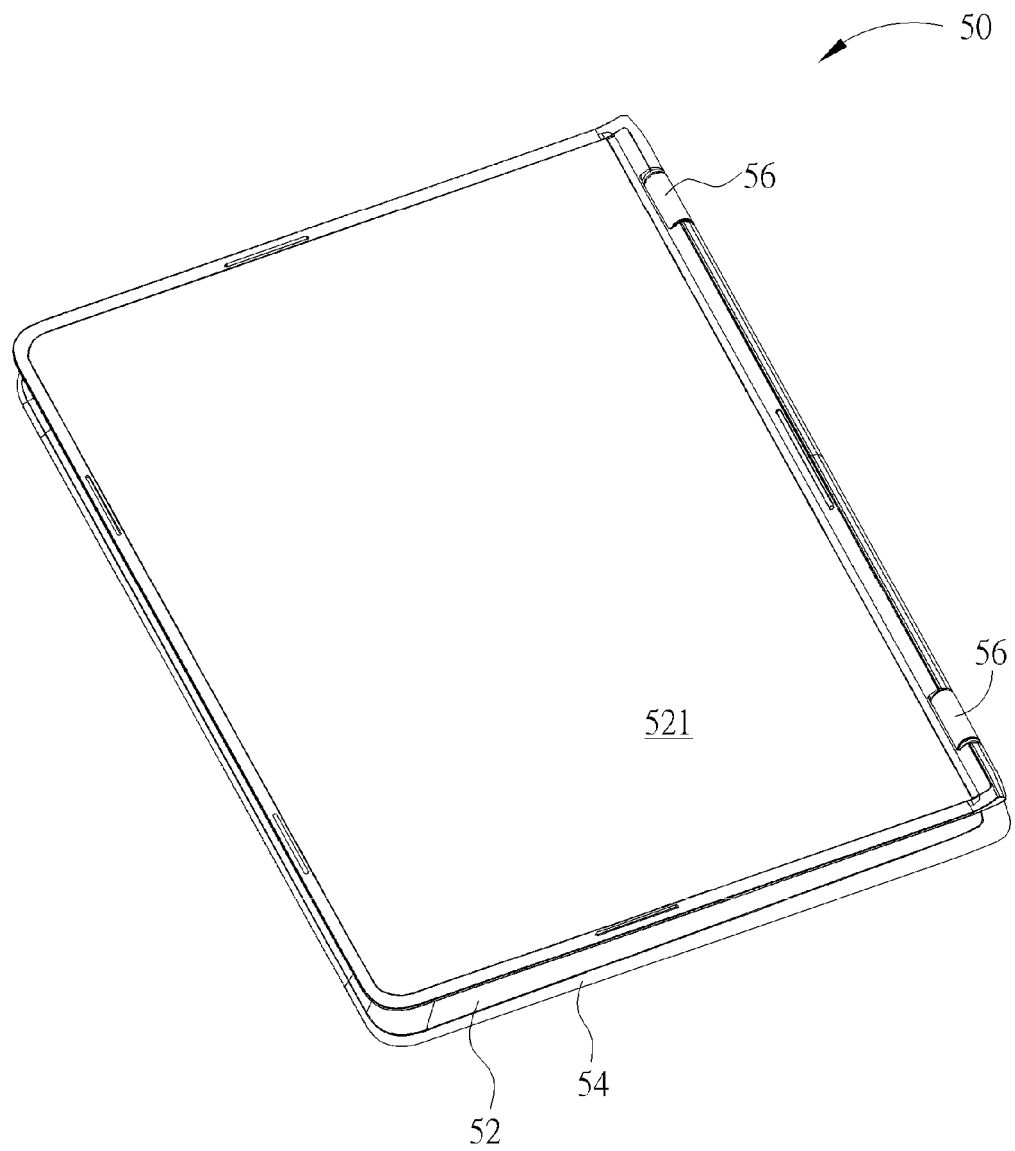

Please refer to FIG. 3 to FIG. 5. FIG. 3 is a diagram of a portable electronic device 50 according to an embodiment of the present disclosure. FIG. 4 and FIG. 5 respectively are diagrams of the portable electronic device 50 at different operation modes according to the embodiment of the present disclosure. The portable electronic device 50 includes a first casing 52, a second casing 54 and two biaxial pivot mechanisms 56. The portable electronic device 50 can be a notebook computer, the first casing 52 can be a screen, and the second casing 54 can be a host. The biaxial pivot mechanisms 56 are respectively disposed between the first casing 52 and the second casing 54, and the first casing 52 can rotate relative to the second casing 54 via the biaxial pivot mechanisms 56. An amount of the biaxial pivot mechanism is not limited to the above-mentioned embodiment, and depends on actual demand. The biaxial pivot mechanism 56 utilizes gears to drive rotation, and a rotary range of the first casing 52 relative to the second casing 54 is between 0~360 degrees.

The operation modes of the portable electronic device 50 can be switched according to the rotary angle of the first casing 52 relative to the second casing 54. For example, as shown in FIG. 3, a display surface 521 of the first casing 52 and an input interface 541 of the second casing 54 face toward the user, and the portable electronic device 50 can be the notebook computer mode. The display surface 521 can be a display panel on the screen, and the input interface 541 can be a touch keyboard or a touch pad on the host. As shown in FIG. 4, the display surface 521 of the first casing 52 faces toward the user, the input interface 541 of the second casing 54 is backward than the user, and a buckling angle is formed between the first casing 52 and the second casing 54; meanwhile, the portable electronic device 50 can be the touch panel stand mode wherein the first casing 52 includes the touch panel. As shown in FIG. 5, the display surface 521 of the first casing 52 is backward than the user, and a back of the second casing 54 directly contacts a back of the first casing 52, which means the first casing 52 is substantially parallel to the second casing 54, and the portable electronic device 50 can be the tablet mode for the touch panel.

As shown in FIG. 3, the portable electronic device 50 further can include a connective cable 58 and a protective component 60. Connectors are respectively disposed on two ends of the connective cable 58 and electrically connected to electronic components of the first casing 52 and the second casing 54, so as to transmit a signal from the host to the screen. The connective cable 58 is disposed on a gap between the biaxial pivot mechanism 56 and the adjacent casing. The connective cable 58 can be set on any position that is not interfered with the gear. The protective component 60 has functions of dust-proof and decoration, which covers the biaxial pivot mechanism 56 and the connective cable 58. The protective component 60 can prevent dust from falling into the gears of the biaxial pivot mechanism 56, to ensure smooth operation of the biaxial pivot mechanism 56. The biaxial pivot mechanism 56 is sheltered by the protective component 60 for preferred aesthetic of the portable electronic device 50.

Figure 6:
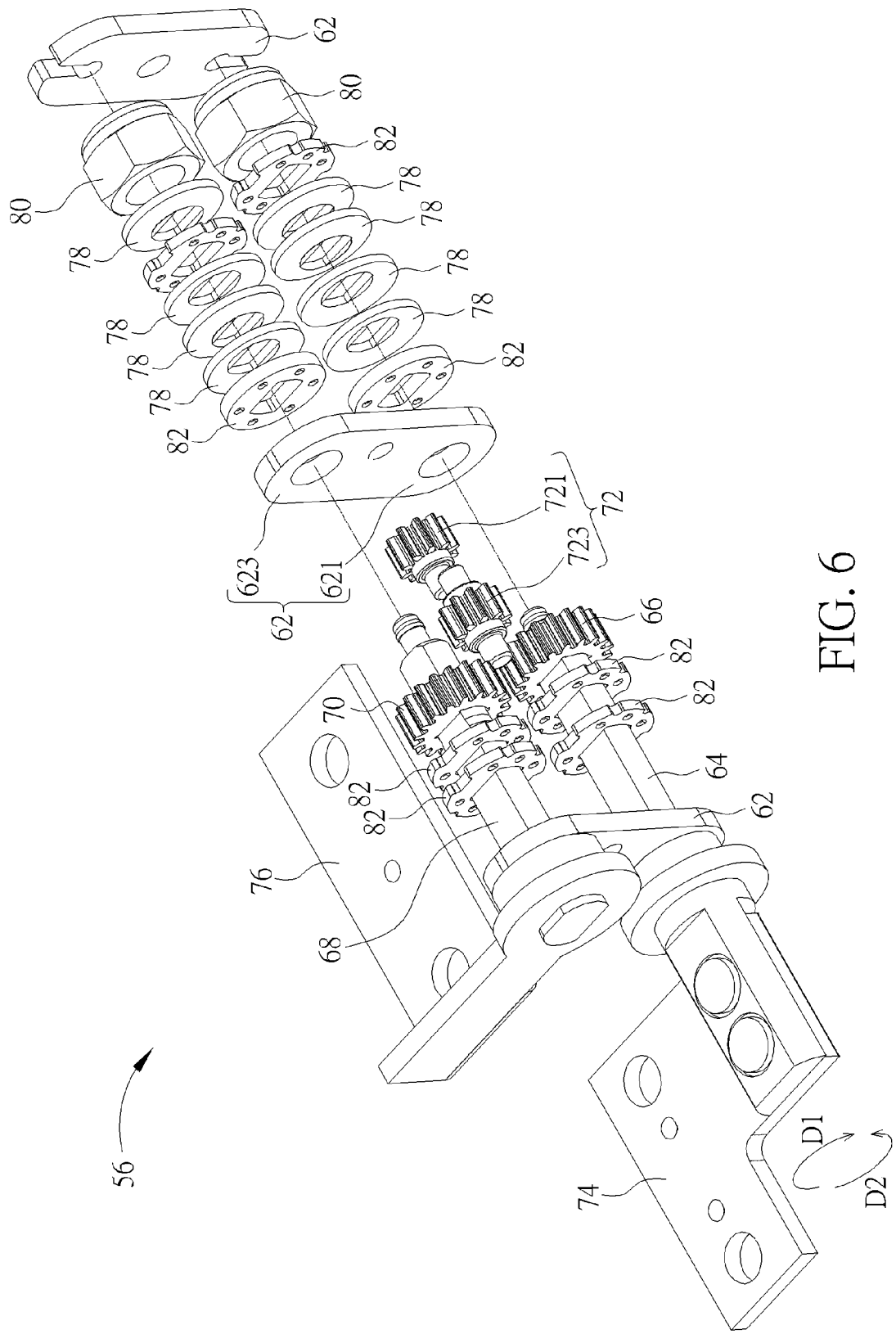
FIG. 6 is an exploded diagram of the biaxial pivot mechanism according to the embodiment of the present disclosure.
Figure 7:
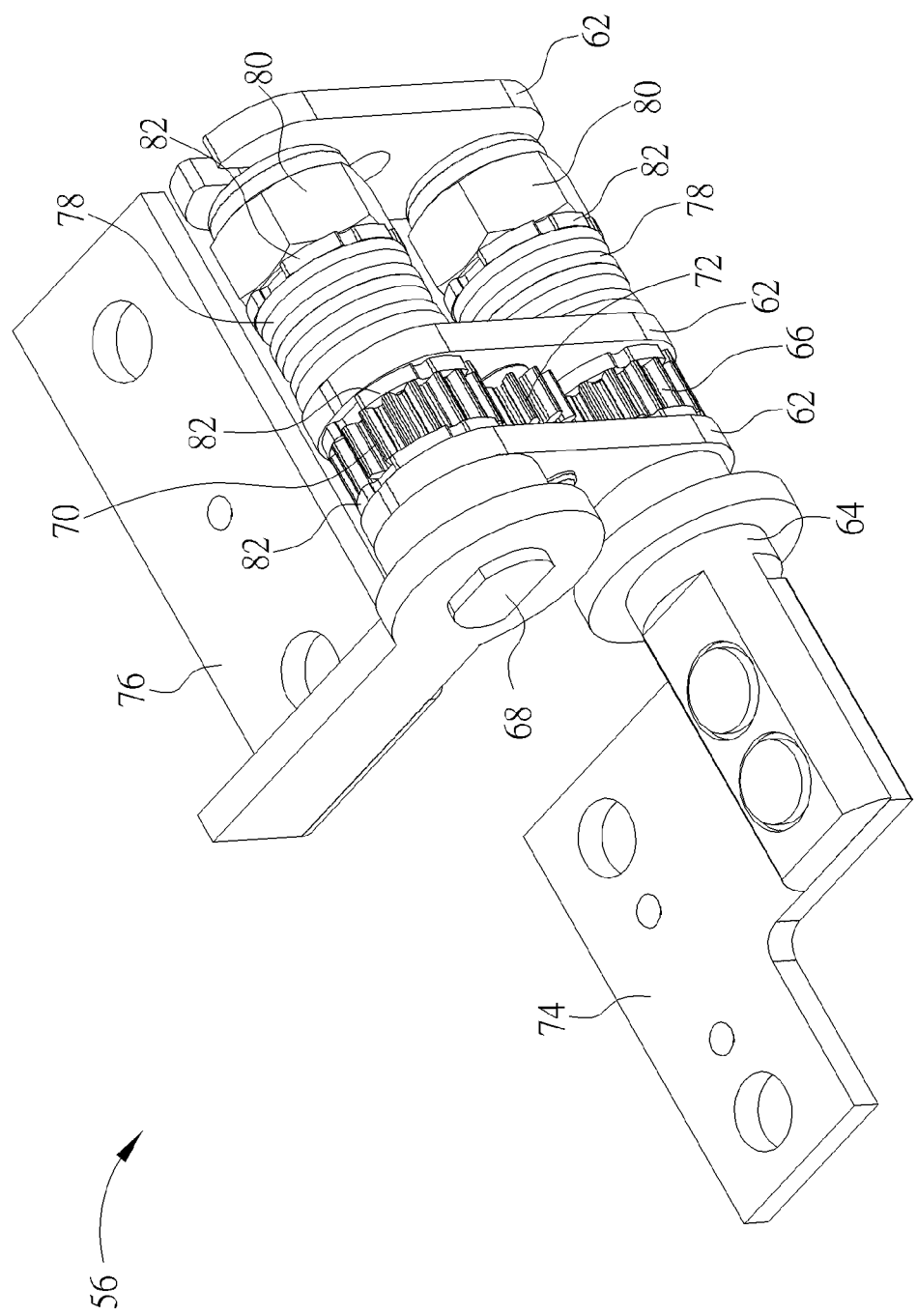
FIG. 7 is an assembly diagram of the biaxial pivot mechanism according to the embodiment of the present disclosure.

Please refer to FIG. 6 and FIG. 7. FIG. 6 is an exploded diagram of the biaxial pivot mechanism 56 according to the embodiment of the present disclosure. FIG. 7 is an assembly diagram of the biaxial pivot mechanism 56 according to the embodiment of the present disclosure. The biaxial pivot mechanism 56 includes a plurality of fixing components 62, a first shaft 64, a first main gear 66, a second shaft 68, a second main gear 70, a transmission gear set 72, a first supporter 74, a second supporter 76, a plurality of torsional components 78, two constraint components 80 and a plurality of buffers 82. The protective component 60 can be fixed on one of the fixing components 62 for hiding the biaxial pivot mechanism 56. Besides, the first shaft 64, the second shaft 68 and parts of the buffers 82 are disposed between the two fixing components 62. The torsional components 78, the constraint components 80 and the other part of the buffers 82 are disposed between the other fixing components 62. The fixing component 62 is a long strap structure which includes a first area 621 and a second area 623. The shafts, the gears and the supporters are disposed between the corresponding areas accordingly to isolate the adjacent components and to prevent structural interference.

The first shaft 64 is disposed between the first areas 621 of the adjacent fixing components 62. A part of the first shaft 64 protrudes from one of the fixing components 62 to connect the first casing 52. The first main gear 66 is disposed on the first shaft 64 via a wedged hole, and the first main gear 66 can be disposed on the first shaft 64 in a coaxially rotary manner. Similarly, the second shaft 68 is disposed between the second areas 623 of the fixing components 62 and connected to the second casing 54, the second main gear 70 is disposed on the second shaft 68 via the wedged hole for the coaxial rotation. The transmission gear set 72 includes several small-size gears, which means dimensions of the secondary gear of the transmission gear set 72 are smaller than dimensions of the main gear. The transmission gear set 72 at least includes a first transmission gear 721 and a second transmission gear 723. The first transmission gear 721 is engaged between the first main gear 66 and the second transmission gear 723. The second transmission gear 723 is engaged between the second main gear 70 and the first transmission gear 721. Because the transmission gear set 72 is engaged between the first main gear 66 and the second main gear 70, when the first main gear 66 rotates at a first direction D1, the transmission gear set 72 is driven by the first main gear 66 to synchronously rotate the second main gear 70 at a second direction D2 opposite to the first direction D1.

As shown in FIG. 6 and FIG. 7, the plurality of torsional components 78 are respectively disposed on the first shaft 64 and the second shaft 68. The torsional component 78 can be a spring gasket for generating the torque by friction. The constraint component 80 can be a screw nut. The two constraint components 80 are respectively disposed on ends of the first shaft 64 and the second shaft 68. The constraint component 80 is installed on the shaft by a locking manner, so as to press the torsional components 78 to generate the torque. Magnitude of the torque is altered according to the locking depth of the constraint component 80 relative to the shaft. The plurality of buffer 82 is respectively disposed between the first main gear 66 and the adjacent fixing component 62, between the second main gear 70 and the adjacent fixing component 62, between each torsional component 78 and the adjacent fixing component 62, and between each torsional component 78 and the corresponding constraint component 80. The buffer 82 can prevent components of the biaxial pivot mechanism 56 from abrasion. For stably connecting the first casing 52 to the second casing 54 by the biaxial pivot mechanism 56, the first supporter 74 and the second supporter 76 are respectively disposed on the first shaft 64 and the second shaft 68 to fix the first casing 52 and the second casing 54. The supporter, such as the second supporter 76, can be directly disposed on an end of the shaft protruding from the fixing component 62. A stretch portion disposed on the end of the shaft protruding from the fixing component 62 can be connected to the supporter, such as the first supporter 74. Applications of the supporter are not limited to the above-mentioned embodiments, and depend on design demand.

Figure 8A:
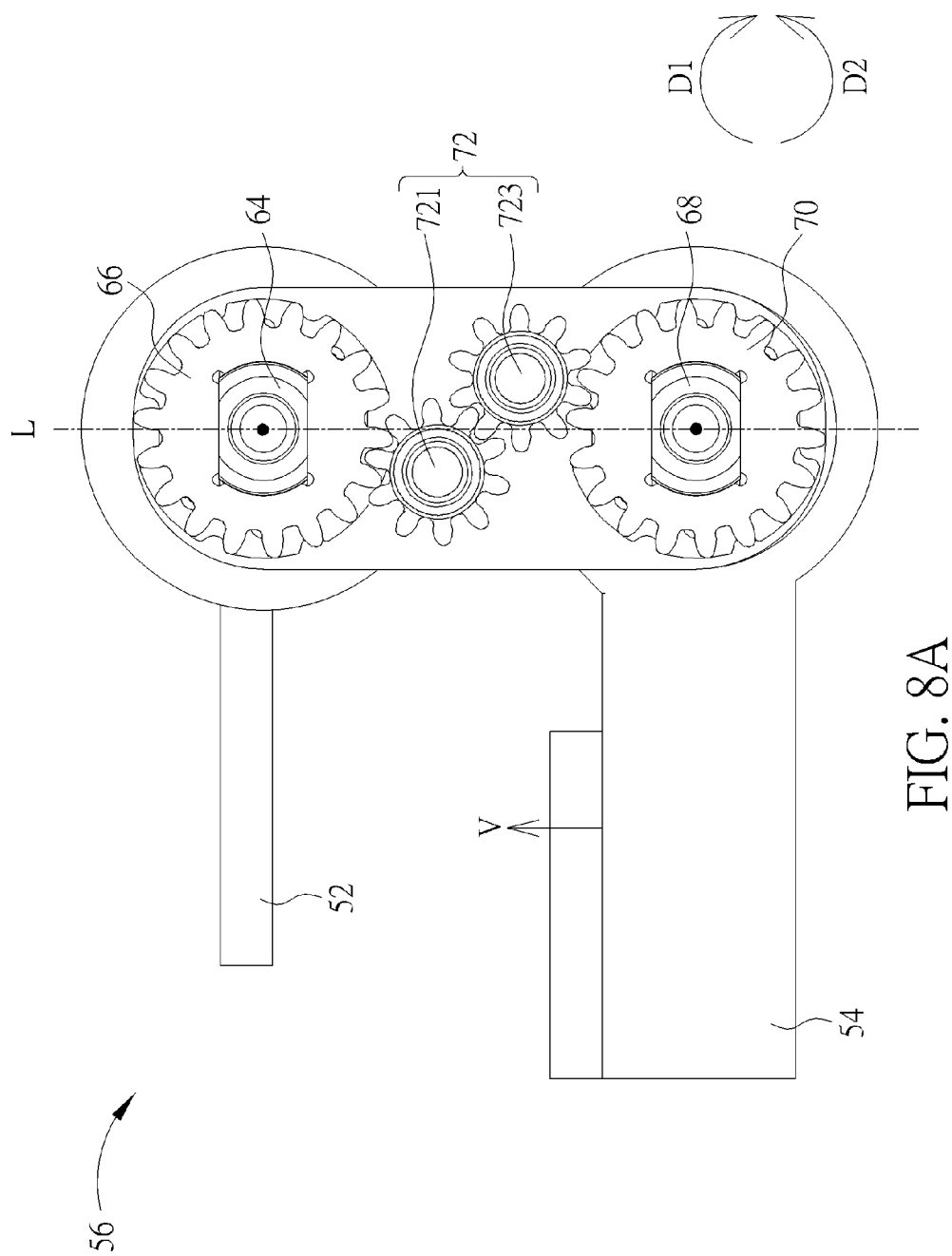

Please refer to FIG. 8. FIG. 8A and FIG. 8B are inner structural diagrams of the biaxial pivot mechanism 56 according to different embodiments of the present disclosure. Dimensions of the first main gear 66 and the second main gear 70 are preferably greater than dimensions of the first transmission gear 721 and the second transmission gear 723. Dimension of the first main gear 66 can be substantially greater than, smaller than and equal to dimension of the second main gear 70, and related embodiments are introduced as following. When the first main gear 66 rotates at the first direction D1, the first transmission gear 721 rotates at the second direction D2, the second transmission gear 723 rotates at the first direction D1, and the second main gear 70 rotates at the second direction D2 in synchrony. Relative position of the transmission gears can be varied to adjust the structural height of the biaxial pivot mechanism 56.

As shown in FIG. 8A, the first transmission gear 721 and the second transmission gear 723 are disposed between the first main gear 66 and the second main gear 70 in an interlaced arrangement; meanwhile, the biaxial pivot mechanism 56 has the smaller structural height and is suitable for the thin-type portable electronic device 50. As the portable electronic device 50 wants more structural space, the biaxial pivot mechanism 56 of the present disclosure adjusts position of the relative position of the transmission gear set 72 instead of varying dimensions of the main gear and the transmission gear. As shown in FIG. 8B, the first transmission gear 721 and the second transmission gear 723 are linearly disposed on a center line L between the first main gear 66 and the second main gear 70, so that the biaxial pivot mechanism 56 has the larger structural height and is suitable for the huge-dimension portable electronic device 50.

It should be mentioned that each gear of the biaxial pivot mechanism 56 has preferably dimensional constraint, individually. For example, a tooth number N of the first main gear 66 (or the second main gear 70) is preferably greater than 12, and a module M of the first main gear 66 (or the second main gear 70) is preferably greater than 0.2 mm; the tooth number N of the first transmission gear 721 (or the second transmission gear 723) is preferably greater than 8, and the module M of the first transmission gear 721 (or the second transmission gear 723) is preferably greater than 0.2 mm. Therefore, the present disclosure can design parameters of the main gear and the transmission gear of the biaxial pivot mechanism 56 according to the said constraint of the tooth number N and the module M by the below formula:

$$D = M \times N \quad \text{(formula 1)}$$

$$D' = D + 2 \times S \quad \text{(formula 2)}$$

$$P = N/D \quad \text{(formula 3)}$$

$$S = 1/P \quad \text{(formula 4)}$$

The tooth number N multiplied by the module M substantially equals the pitch circle diameters D of the main gear and the transmission gear, such as the formula 1. Dimension of the pitch circle diameter D is preferably greater than 4 mm for surrounding the shaft and keeping structural strength. Dimension of the pitch circle diameter D can be adjusted according to dimension of the corresponding shaft. The module M represents engaged dimension of the main gear and the transmission gear, to enhance structural tolerance and the structural strength. Tooth crowns S of the main gear and the transmission gear are preferably greater than 0.2 mm to prevent the gears from idle due to disengagement. Accordingly, the pitch circle diameter D and the twice tooth crown S are added up to substantially equal outer diameters D' of the main gear and the transmission gear, such as the formula 2. The tooth number N divided by the pitch circle diameter D substantially equals diametral pitches P of the main gear and the transmission gear, and the tooth crown S is substantially a reciprocal value of the diametral pitch P, such as the formula 3 and formula 4. Thus, gears are designed according to the above-mentioned formulas, so that the first main gear 66 and the second main gear 70 have the stably structural strength to sustain the torque generated by the biaxial pivot mechanism 56, the transmission gear set 72 can be stably engaged between the first main gear 66 and the second main gear 70, and variation of the rotary angle of the first main gear 66 can accurately conform to variation of the rotary angle of the second main gear 70.

The gear ratio of the first main gear 66 to the second main gear 70 of the biaxial pivot mechanism 56 is adjustable, and the rotary angle of the first main gear 66 relative to the second main gear 70 is variable accordingly. While the tooth number of the first main gear 66 divided by the tooth number of the second main gear 70 equals an integer (the value without unlimited circulation), the gear ratio of the said gears is suitable for the biaxial pivot mechanism 56 of the present disclosure. As shown in FIG. 8, the gear ratio of the first main gear 66 to the second main gear 70 equals 1, the rotary angle of the first main gear 66 is substantially equal to the rotary angle of the second main gear 70. When the portable electronic device 50 is switched from the notebook computer mode shown in FIG. 3 to the tablet mode (for the touch panel) shown in FIG. 5, the first casing 52 (the screen) rotates to 180 degrees, and the second casing 54 (the host) synchronously rotates to 180 degrees. The rotary angles of the first casing 52 and the second casing 54 are synchronous and identical, the biaxial pivot mechanism 56 is disposed between the screen and the host in a manner that the center line L of the first main gear 66 and the second main gear 70 is substantially parallel to the normal vector V of the second casing 54, so as to provide the smooth operation of the portable electronic device 50.

Figure 9A:
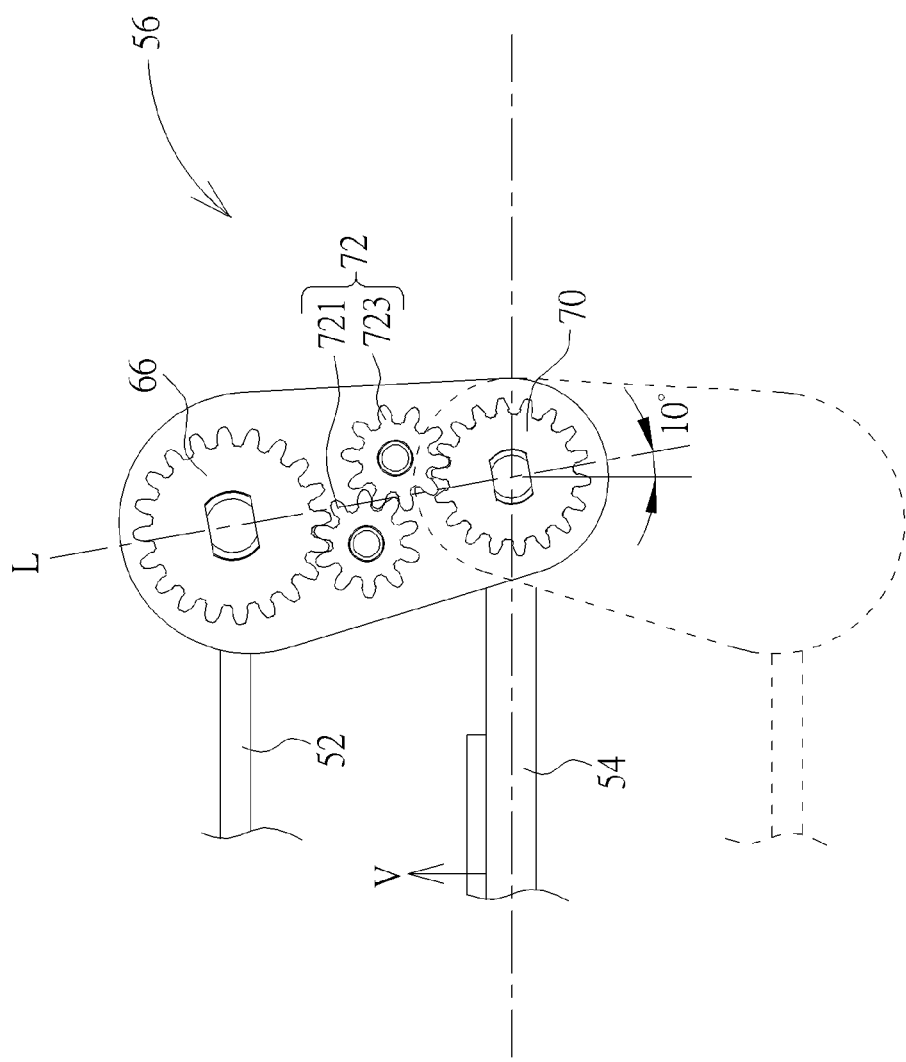

Please refer to FIG. 9. FIG. 9 is a partly structural diagram of the biaxial pivot mechanism 56 according to the other embodiment of the present disclosure. The gear ratio of the first main gear 66 to the second main gear 70 equals 0.8. As shown in FIG. 9A, the first main gear 66 is greater than the second main gear 70, the portable electronic device 50 is switched between the notebook computer mode and the tablet mode (for the touch panel), the maximal rotary angle of the first casing 52 (the screen) is 160 degrees, and the maximal rotary angle of the second casing 54 (the host) is 200 degrees. As shown in FIG. 9B, the first main gear 66 is smaller than the second main gear 70, the portable electronic device 50 is switched between the notebook computer mode and the tablet mode (for the touch panel), the maximal rotary angle of the first casing 52 (the screen) is 200 degrees, and the maximal rotary angle of the second casing 54 (the host) is 160 degrees. Inverse positions of the first casing 52 and the second casing 54 are as dotted lines shown in FIG. 9. Due to the varied gear ratio, the biaxial pivot mechanism 56 is disposed between the screen and the host in a manner that an angle of the center line L between the first main gear 66 and the second main gear 70 relative to the normal vector V of the second casing 54 is substantially equal to 10 degrees.

Figure 10A:
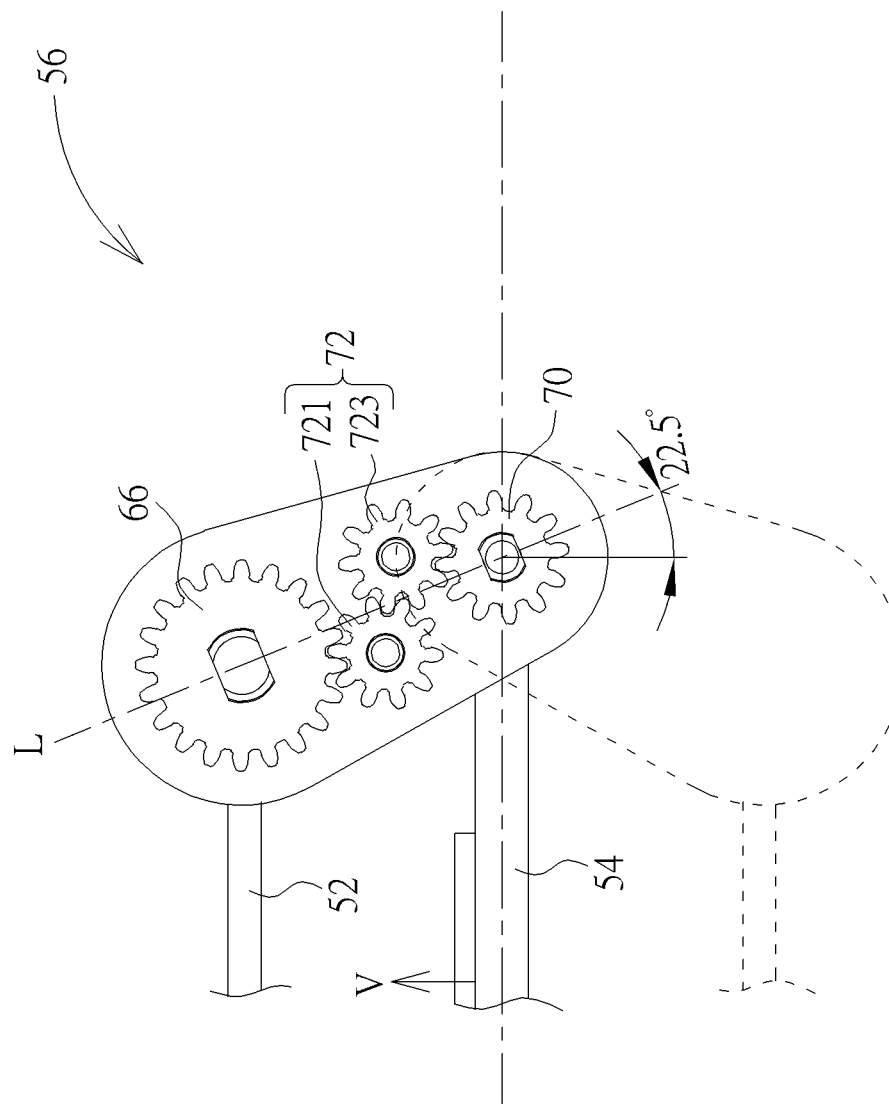
FIG. 10A and FIG. 10B are partly structural diagrams of the biaxial pivot mechanism according to the other embodiment of the present disclosure.
Figure 10B:
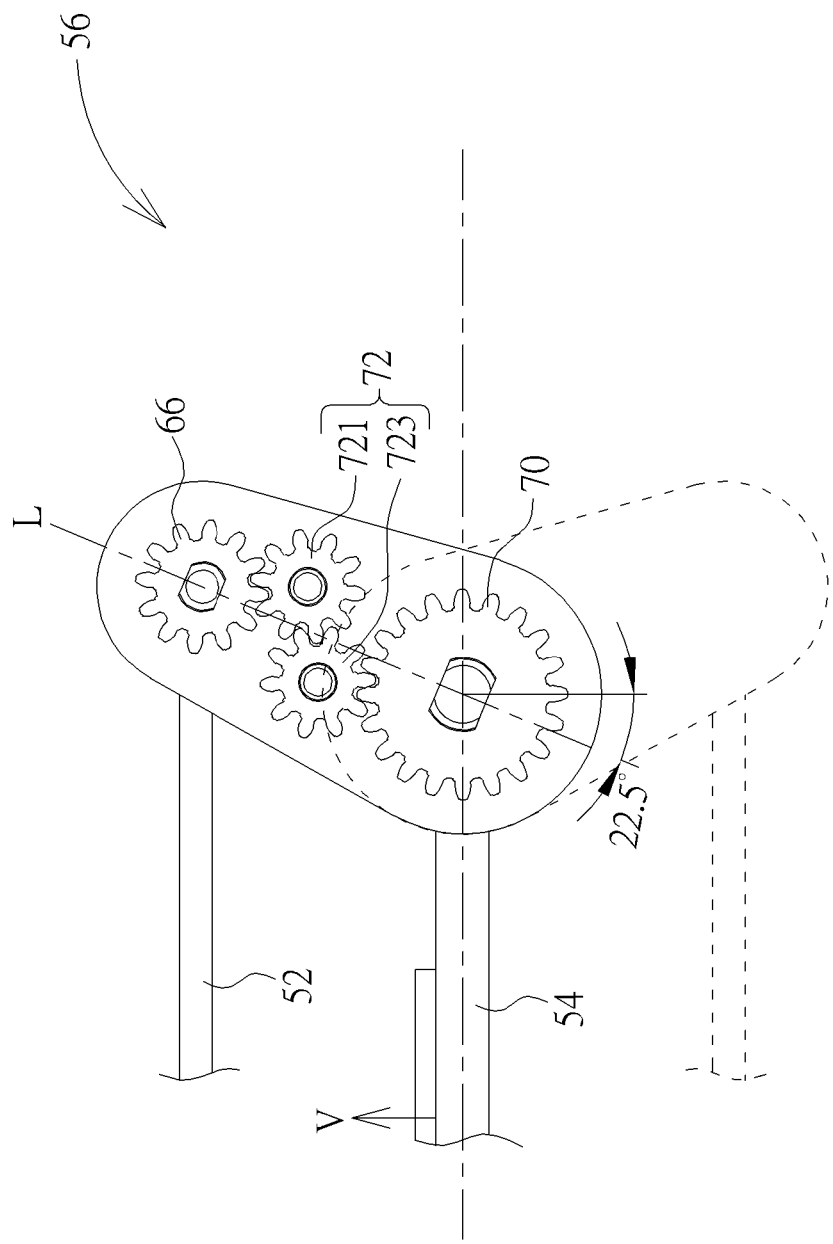

Please refer to FIG. 10. FIG. 10 is a partly structural diagram of the biaxial pivot mechanism 56 according to the other embodiment of the present disclosure. The gear ratio of the first main gear 66 to the second main gear 70 equals 0.6. As shown in FIG. 10A, the first main gear 66 is greater than the second main gear 70, the portable electronic device 50 is switched between the notebook computer mode and the tablet mode (for the touch panel), the maximal rotary angle of the first casing 52 (the screen) is 135 degrees, and the maximal rotary angle of the second casing 54 (the host) is 225 degrees. As shown in FIG. 10B, the first main gear 66 is smaller than the second main gear 70, the portable electronic device 50 is switched between the notebook computer mode and the tablet mode (for the touch panel), the maximal rotary angle of the first casing 52 (the screen) is 225 degrees, and the maximal rotary angle of the second casing 54 (the host) is 135 degrees. Inverse positions of the first casing 52 and the second casing 54 are as dotted lines shown in FIG. 10. In this embodiment, the biaxial pivot mechanism 56 is disposed between the screen and the host in a manner that an angle of the center line L between the first main gear 66 and the second main gear 70 relative to the normal vector V of the second casing 54 is substantially equal to 22.5 degrees.

Figure 11A:
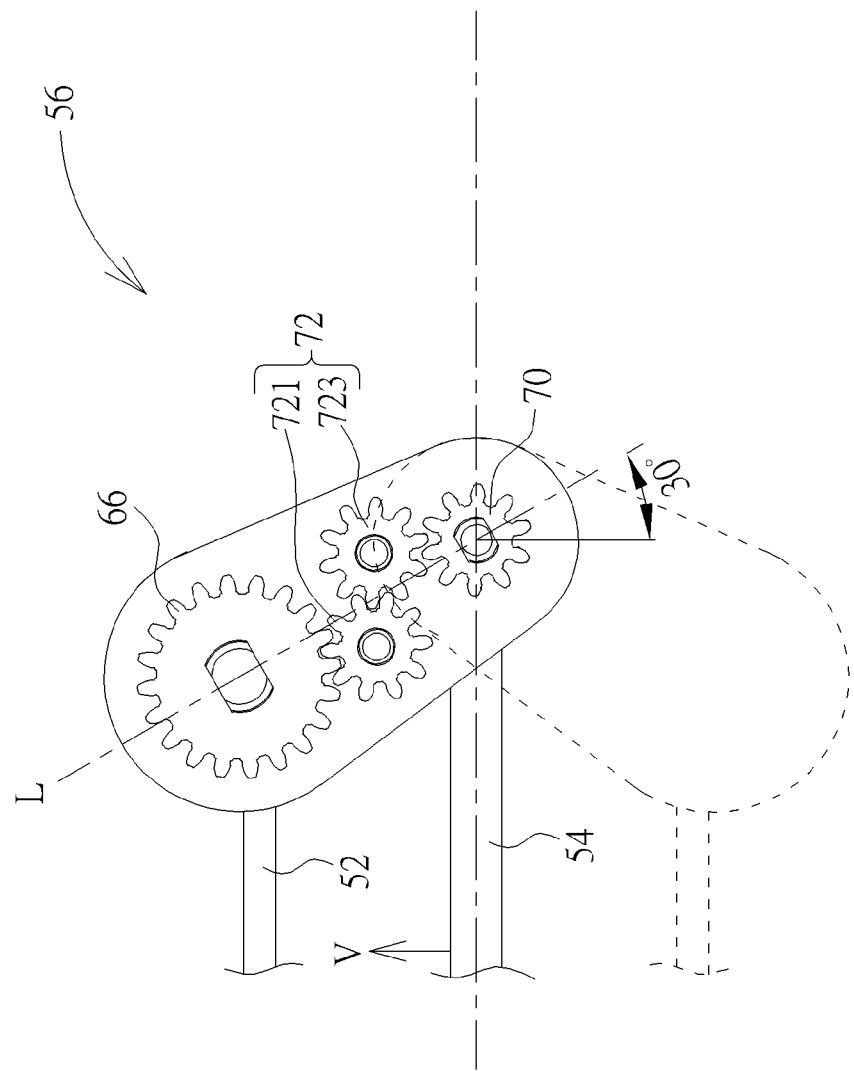
FIG. 11A and FIG. 11B are partly structural diagrams of the biaxial pivot mechanism according to the other embodiment of the present disclosure.
Figure 11B:
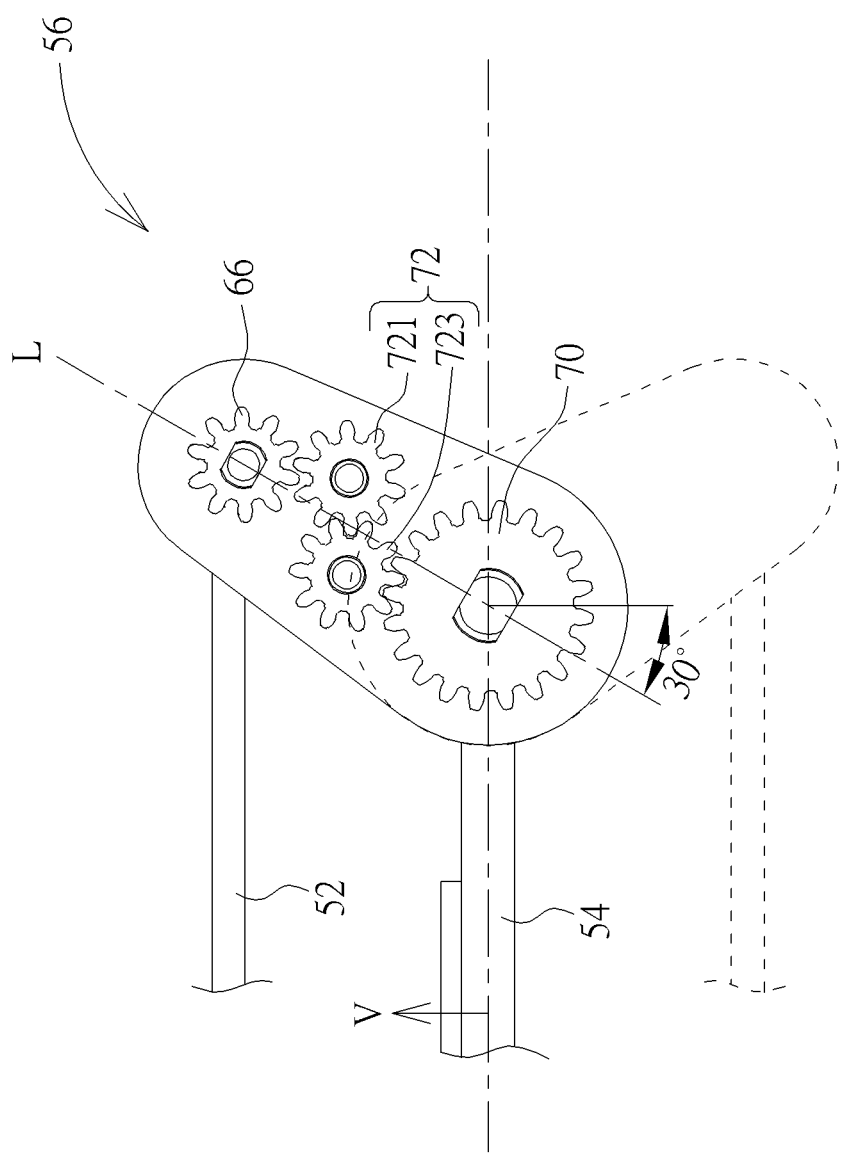

Please refer to FIG. 11. FIG. 11 is a partly structural diagram of the biaxial pivot mechanism 56 according to the other embodiment of the present disclosure. The gear ratio of the first main gear 66 to the second main gear 70 equals 0.5. As shown in FIG. 11A, the first main gear 66 is greater than the second main gear 70, the portable electronic device 50 is switched between the notebook computer mode and the tablet mode (for the touch panel), the maximal rotary angle of the first casing 52 (the screen) is 120 degrees, and the maximal rotary angle of the second casing 54 (the host) is 240 degrees. As shown in FIG. 11B, the first main gear 66 is smaller than the second main gear 70, the portable electronic device 50 is switched between the notebook computer mode and the tablet mode (for the touch panel), the maximal rotary angle of the first casing 52 (the screen) is 240 degrees, and the maximal rotary angle of the second casing 54 (the host) is 120 degrees. Inverse positions of the first casing 52 and the second casing 54 are as dotted lines shown in FIG. 11. In this embodiment, the biaxial pivot mechanism 56 is disposed between the screen and the host in a manner that an angle of the center line L between the first main gear 66 and the second main gear 70 relative to the normal vector V of the second casing 54 is substantially equal to 30 degrees.

Figure 12A:
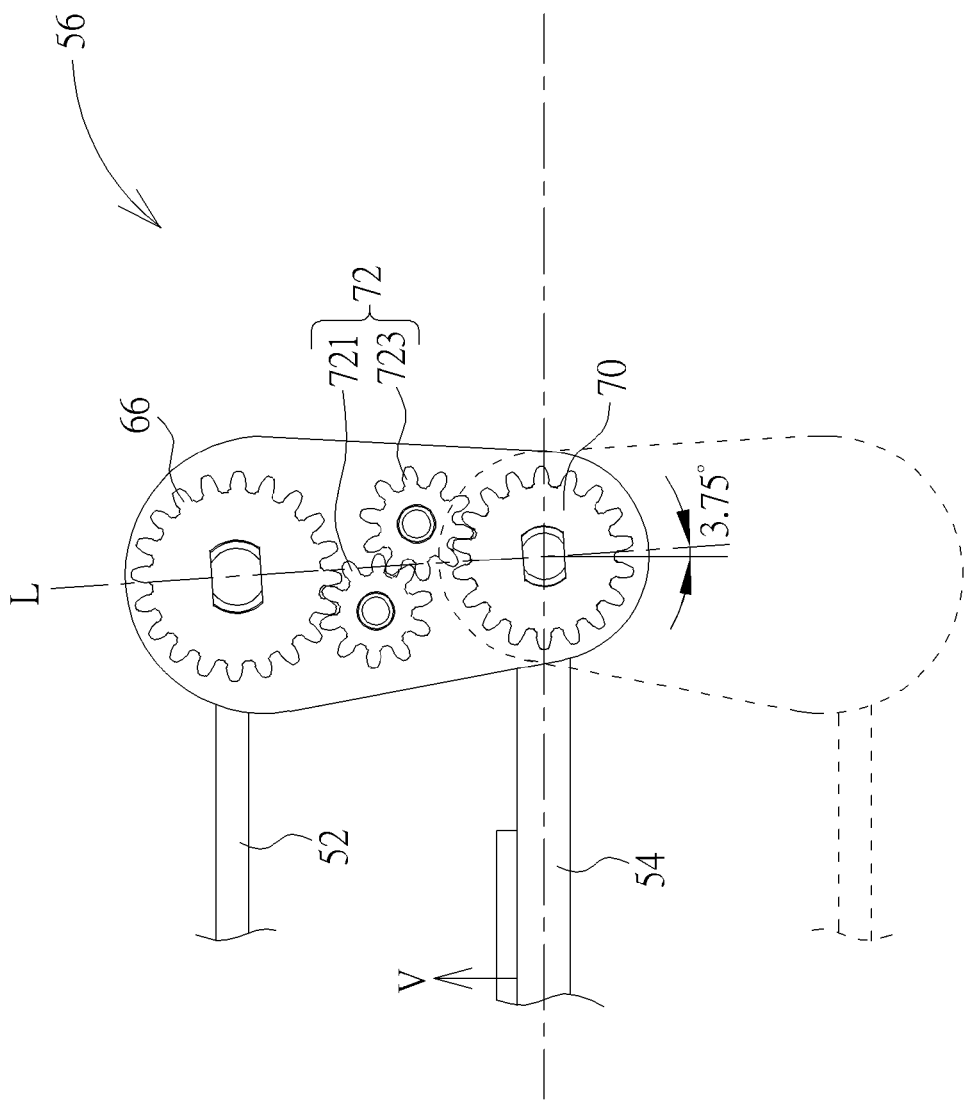
FIG. 12A and FIG. 12B are partly structural diagrams of the biaxial pivot mechanism according to the other embodiment of the present disclosure.
Figure 12B:
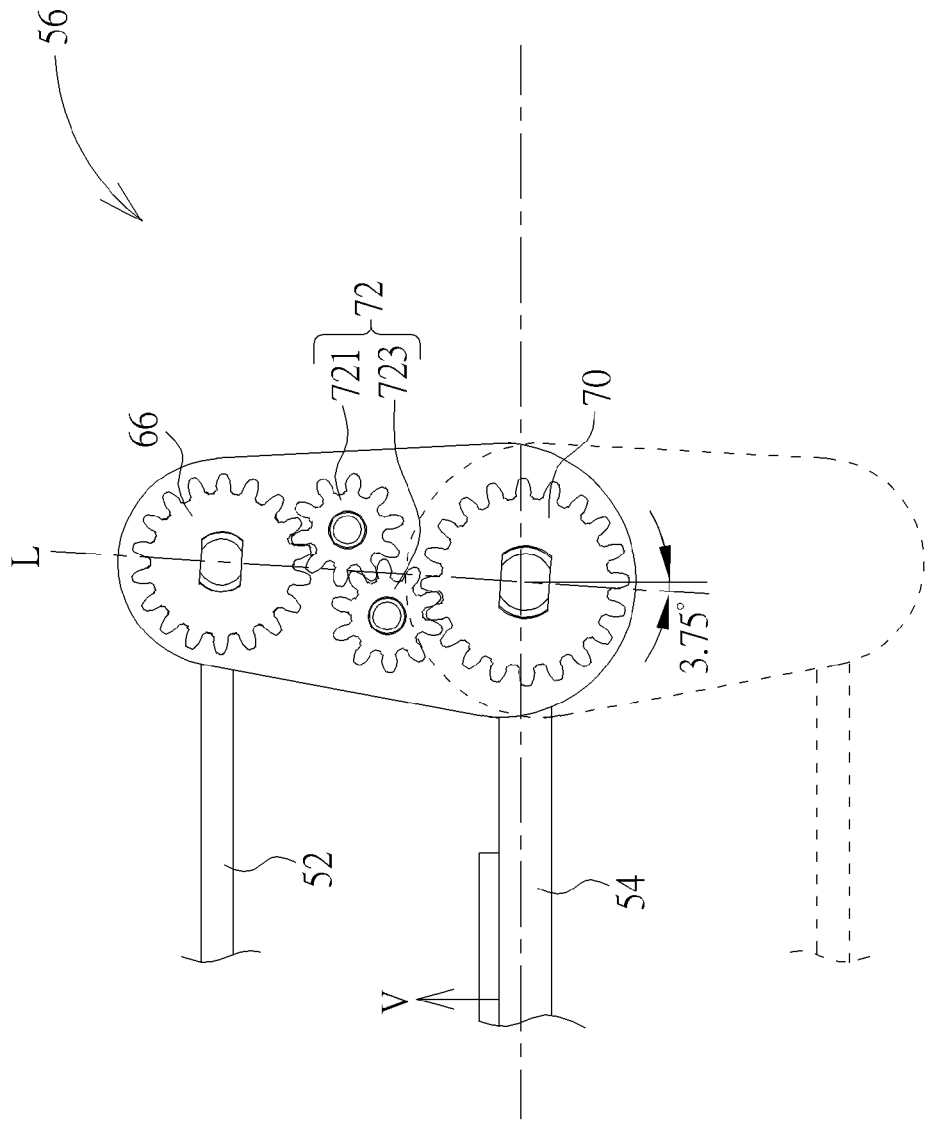

Please refer to FIG. 12. FIG. 12 is a partly structural diagram of the biaxial pivot mechanism 56 according to the other embodiment of the present disclosure. The gear ratio of the first main gear 66 to the second main gear 70 equals 0.92. As shown in FIG. 12A, the first main gear 66 is greater than the second main gear 70, the portable electronic device 50 is switched between the notebook computer mode and the tablet mode (for the touch panel), the maximal rotary angle of the first casing 52 (the screen) is 172.5 degrees, and the maximal rotary angle of the second casing 54 (the host) is 187.5 degrees. As shown in FIG. 12B, the first main gear 66 is smaller than the second main gear 70, the portable electronic device 50 is switched between the notebook computer mode and the tablet mode (for the touch panel), the maximal rotary angle of the first casing 52 (the screen) is 187.5 degrees, and the maximal rotary angle of the second casing 54 (the host) is 172.5 degrees. Inverse positions of the first casing 52 and the second casing 54 are as dotted lines shown in FIG. 12. In this embodiment, the biaxial pivot mechanism 56 is disposed between the screen and the host in a manner that an angle of the center line L between the first main gear 66 and the second main gear 70 relative to the normal vector V of the second casing 54 is substantially equal to 3.75 degrees.

In conclusion, the biaxial pivot mechanism 56 of the present disclosure disposes the transmission gear set 72 between the first main gear 66 and the second main gear 70. When the first main gear 66 rotates at a specific direction (such as the first direction D1), the transmission gear set 72 can drive the second main gear 70 to synchronously rotate at the direction (such as the second direction D2) opposition of the specific direction. As the first casing 52 is unfolded, the first casing 52 rotates relative to the biaxial pivot mechanism 56 at a predetermined direction (such as the first direction D1); meanwhile, the biaxial pivot mechanism 56 rotates relative to the second casing 54 at the predetermined direction due to rotation of the first casing 52, so that the first casing 52 can be unfolded relative to the second casing 54. The angles of the center line L between the first main gear 66 and the second main gear 70 relative to the normal vector V of the second casing 54 are not limited to the above-mentioned embodiments, and depend on design demand. The maximal rotary angles of the screen and the host are adjustable according to the angle between the center line L and the normal vector V, and the detailed description is omitted herein for simplicity.

Please refer to FIG. 13. FIG. 13 is a diagram of the portable electronic device 50 at different operation modes according to the embodiment of the present disclosure. As shown in FIG. 13A, the portable electronic device 50 can be the folded notebook computer. As shown in FIG. 13A to FIG. 13C, the first casing 52 of the portable electronic device 50 is unfolded to switch as the notebook computer mode. As shown in FIG. 13C to FIG. 13F, the rotary angle of the first casing 52 relative to the second casing 54 is increased to switch the portable electronic device 50 to the touch panel stand mode. As shown in FIG. 13F to FIG. 13G, the back of the first casing 52 contacts the back of the second casing 54, and the portable electronic device 50 is switched to the tablet mode (for the touch panel).

Figure 14:
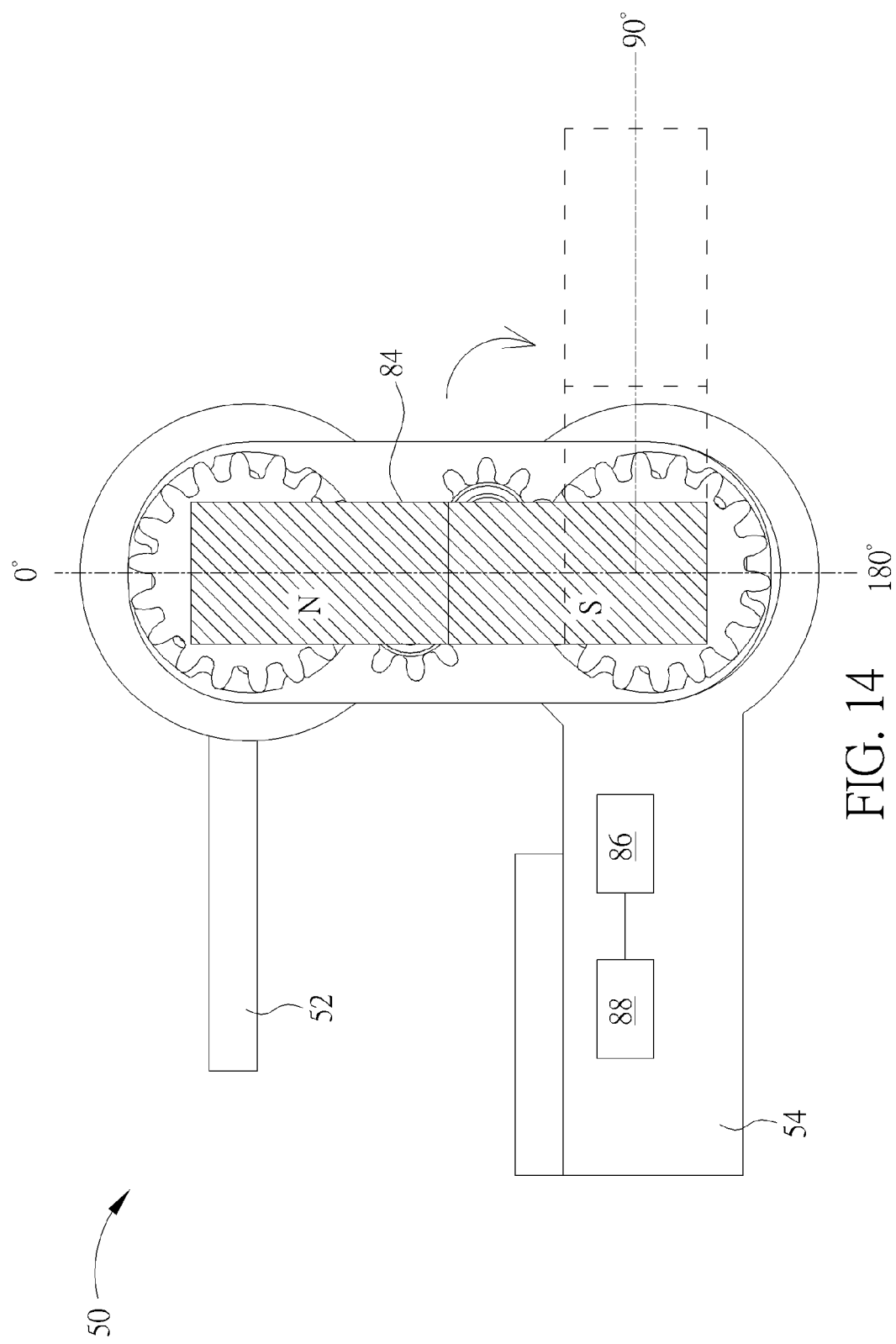
FIG. 14 is a partial diagram of the portable electronic device according to an embodiment of the present disclosure.

Please refer to FIG. 14. FIG. 14 is a partial diagram of the portable electronic device 50 according to an embodiment of the present disclosure. Operation mode of the portable electronic device 50 is switched by relative rotation between the first casing 52 and the second casing 54, functions of the displaying surface 521 and the input interface 541 are accordingly switched by motion of the biaxial pivot mechanism 56. The biaxial pivot mechanism 56 further can include a magnetic component 84 disposed on the fixing component 62. The magnetic component 84 can be a long strap structure, which includes a first pole N and a second pole S opposite to each other. The portable electronic device 50 further includes a magnetic sensor 86 disposed on the first casing 52 or the second casing 54. In this embodiment, the magnetic sensor 86 is disposed on the second casing 54.

The magnetic sensor 86 can be a Hall IC disposed on a position adjacent to the magnetic component 84, and is adapted to output a signal to drive a processor 88 of the portable electronic device 50. As the first casing 52 rotates relative to the second casing 54, the magnetic component 84 rotates relative to the magnetic sensor 86 via the second pole 5, so as to adjust relative distance between the first pole N and the magnetic sensor 86. The magnetic sensor 86 can output the switching signal to control the displaying surface 521 or the input interface 541 according to variation of the magnetic flux intensity.

When rotary angle of the magnetic component 84 is substantially within a range between 0~90 degrees, rotary angle of the first casing 52 relative to the second casing 54 is substantially within a range between 0~180 degrees, the portable electronic device 50 can be the notebook computer mode. When the rotary angle of the magnetic component 84 is substantially within the range between 90~180 degrees, the rotary angle of the first casing 52 relative to the second casing 54 is substantially within the range between 180~360 degrees, the portable electronic device 50 can be the touch panel mode. Therefore, the magnetic flux intensity induced by the magnetic sensor 86 is minimal when the magnetic component 84 rotates to 90 degrees, and the processor 88 automatically switches the operation mode of the portable electronic device 50 according to the switching signal of the magnetic sensor 86.

Figure 15:
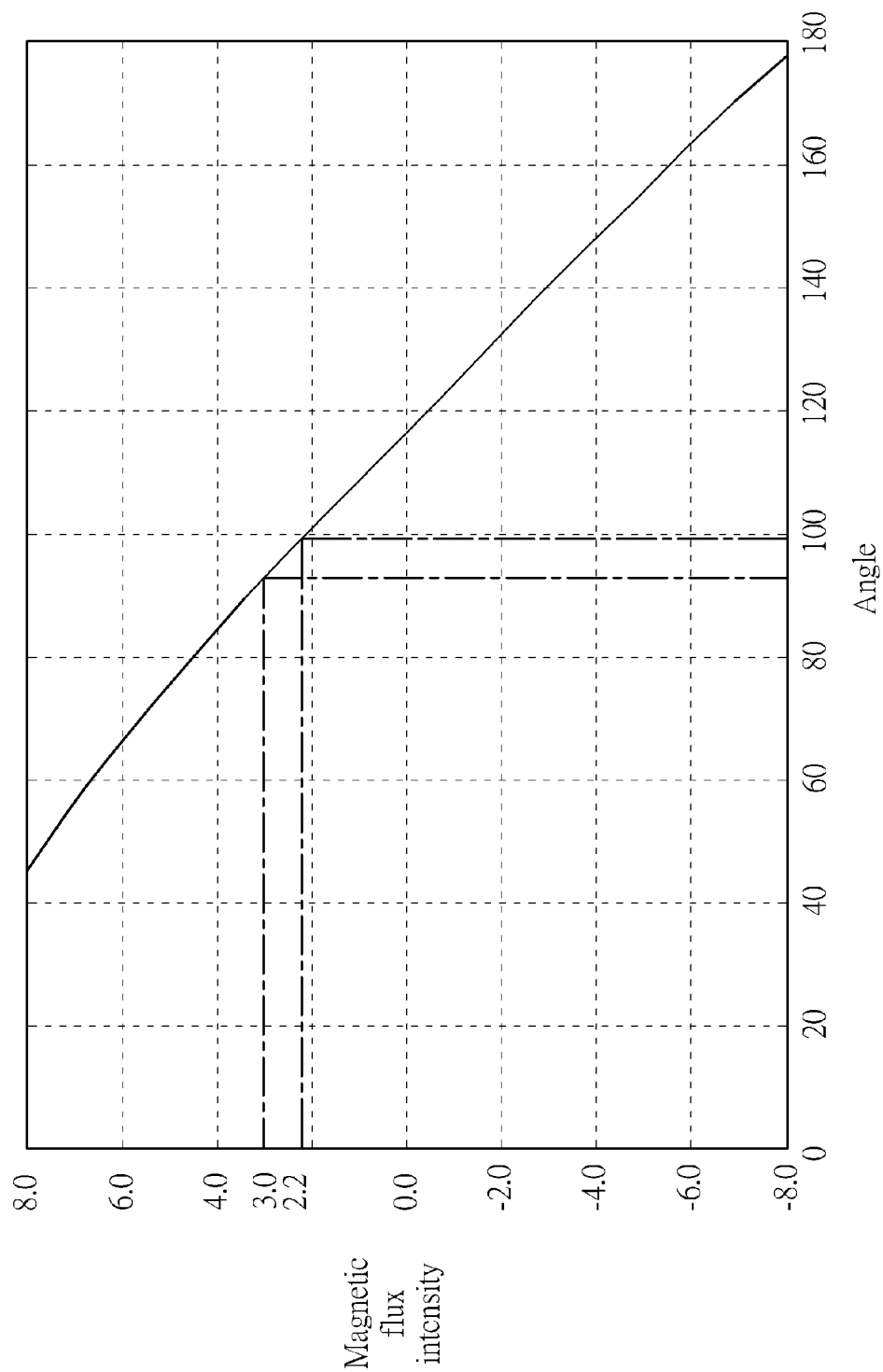
FIG. 15 is a comparative chart of the magnetic component and the magnetic sensor according to the embodiment of the present disclosure.

Please refer to FIG. 15. FIG. 15 is a comparative chart of the magnetic component 84 and the magnetic sensor 86 according to the embodiment of the present disclosure. The comparative relation illustrated in FIG. 15 is suitable for the portable electronic device 50 shown in FIG. 14. When the biaxial pivot mechanism 56 (or the magnetic component 84) rotates from 0 degree to the range of 87~108.3 degrees at the clockwise direction, the magnetic flux intensity induced by the magnetic sensor 86 is gradually decreased from positive maximum to be lower than 2.2 Tesla, and the magnetic sensor 86 is switched from operation point to release point. The magnetic sensor 86 outputs the switching signal to actuate the automatic rotary function of the displaying surface 521 and shut down the operational function of the input interface 541 via the processor 88, and the portable electronic device 50 is switched to the touch panel mode. When the biaxial pivot mechanism 56 (or the magnetic component 84) rotates from 180 degree to the range of 95.4~74 degrees at the counterclockwise direction, the magnetic flux intensity induced by the magnetic sensor 86 is gradually increased from negative maximum to be greater than 3.0 Tesla, and the magnetic sensor 86 is switched from the release point to the operation point. The switching signal outputted from the magnetic sensor 86 drives the processor 88 to shut down the automatic rotary function of the displaying surface 521 and actuate the operational function of the input interface 541, and the portable electronic device 50 is switched to the notebook computer mode.

It should be mentioned that a threshold is designed according to property of the magnetic component 84 and the magnetic sensor 86. In the preferred embodiment, the threshold can preferably be, but not limited to, within a range of 2.2~3.0 Tesla. Application of switch property of the magnetic sensor 86, specific angle of the biaxial pivot mechanism 56 to actuate the magnetic sensor 86, and pole status of the magnetic component 84 are not limited to the above-mentioned embodiment, and depend on design demand.

Figure 16:
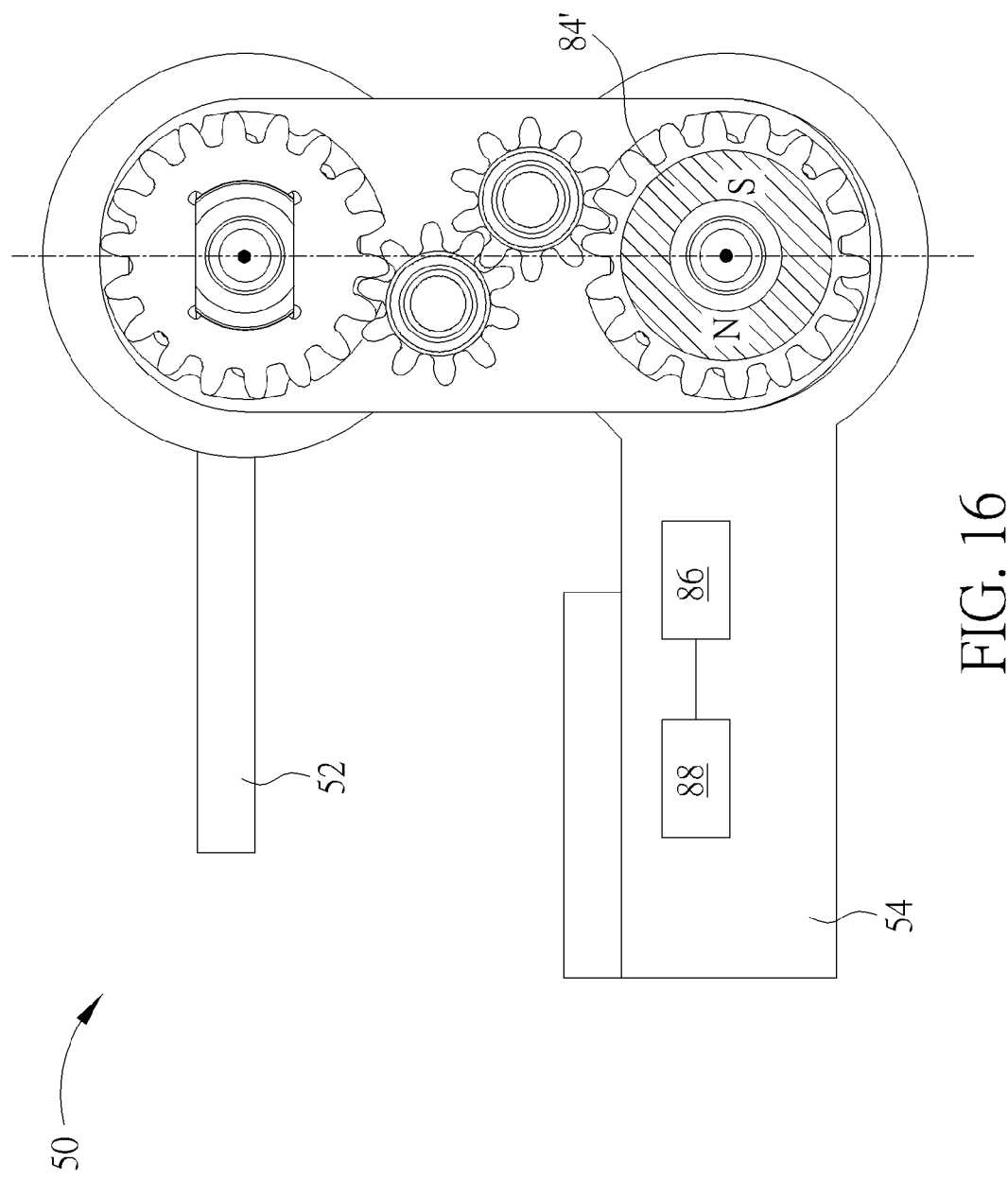
FIG. 16 is a partial diagram of the portable electronic device according to the other embodiment of the present disclosure.

Please refer to FIG. 16. FIG. 16 is a partial diagram of the portable electronic device 50 according to the other embodiment of the present disclosure. In this embodiment, elements having the same numeral as ones of the embodiment shown in FIG. 14 have the same structures and functions, and the detailed description is omitted herein for simplicity. Difference between the embodiments is that the magnetic component 84' can be an annular structure. The first pole N and the second pole S respectively are arc units, and ends of the arc units are connected to each other to form the annular magnetic component 84'. The magnetic component 84' can rotate via a boundary between the first pole N and the second pole S. As the first pole N or the second pole S of the magnetic component 84' directly faces toward the magnetic sensor 86, the magnetic sensor 86 senses the larger magnetic flux intensity. As the magnetic component 84' substantially rotates to 90 degrees with the biaxial pivot mechanism 56, the magnetic influx intensity induced by the magnetic sensor 86 is minimal and the magnetic sensor 86 is switched between the release point and the operation point.

For example, the magnetic sensor 86 drives the processor 88 to switch the portable electronic device 50 into the touch panel mode according to the variation of the magnetic influx intensity when the magnetic component 84' rotates from 0 degree to a position greater than 90 degrees at the clockwise direction. The magnetic sensor 86 further drives the processor 88 to switch the portable electronic device 50 into the notebook computer mode according to the variation of the magnetic influx intensity when the magnetic component 84' rotates from 180 degrees to a position smaller than 90 degrees at the counterclockwise direction.

Comparing to the prior art, the torsional spring with full torque is unnecessary in the present disclosure, the biaxial pivot mechanism of the present disclosure uniformly distributes the torque over the first shaft and the second shaft, which means the first shaft and the second shaft respectively includes the torsional component with half torque, to effectively prevent the biaxial pivot mechanism from damage due to intolerable force. Furthermore, the present disclosure can be applied to the portable electronic device with any dimension. The gears of the biaxial pivot mechanism are standard mode, dimension of the gears are not varied according to volume of the portable electronic device, and the biaxial pivot mechanism can keep the preferred aesthetic. The present disclosure disposes the plurality of transmission gears between the main gears of the biaxial pivot mechanism, the position variation of the transmission gears, such as the interlaced arrangement and the linear arrangement, can be utilized to conveniently adjust the structural height of the biaxial pivot mechanism, so that the biaxial pivot mechanism is suitable for any types of portable electronic device. Distance between the magnetic component and the magnetic sensor is varied by rotation of the biaxial pivot mechanism. The magnetic sensor is switched between the release point and the operation point according to variation of the magnetic influx intensity, so as to automatically switch the notebook computer mode and the touch panel mode of the portable electronic device. The biaxial pivot mechanism and the portable electronic device of the present disclosure has advantages of easy assembly, low manufacturing cost, long service life and smooth operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A biaxial pivot mechanism for rotating a first casing relative to a second casing, the biaxial pivot mechanism comprising:
   at least one fixing component, the fixing component comprising a first area and a second area;
   a first shaft disposed on the first area of the fixing component and connected to the first casing;
   a first main gear disposed on the first shaft in a coaxially rotary manner;
   a second shaft disposed on the second area of the fixing component and connected to the second casing;
   a second main gear disposed on the second shaft in a coaxially rotary manner, the first main gear and the second main gear having different numbers of teeth; and
   a transmission gear set engaged between the first main gear and the second main gear, wherein as the first main gear rotates at a first direction, the transmission gear set is driven by the first main gear to synchronously rotate the second main gear at a second direction opposite to the first direction, the transmission gear set comprises a first transmission gear and a second transmission gear having same tooth numbers and same modules, the first transmission gear is engaged with the first main gear and the second transmission gear, the second transmission gear is engaged with the second main gear and the first transmission gear, wherein a center line connected between axial centers of the first main gear and the second main gear is not parallel to a normal vector of the second casing folded with the first casing, and an angle between the center line and the normal vector is varied according to a gear ratio of the first main gear to the second main gear.

2. The biaxial pivot mechanism of claim 1, wherein the biaxial pivot mechanism further comprises:
   a first supporter disposed on the first shaft and fixed to the first casing; and
   a second supporter disposed on the second shaft and fixed to the second casing.

3. The biaxial pivot mechanism of claim 1, wherein the first transmission gear rotates at the second direction and the second transmission gear rotates at the first direction when the first main gear rotates at the first direction.

4. The biaxial pivot mechanism of claim 3, wherein the biaxial pivot mechanism further comprises:
   a plurality of torsional components disposed on the first shaft;
   a constraint component disposed on the first shaft to press the plurality of torsional components; and
   a plurality of buffers disposed between the first main gear and the fixing component, between the torsional component and the fixing component, and between the torsional component and the constraint component.

5. The biaxial pivot mechanism of claim 4, wherein the gear ratio of the first main gear to the second main gear is 0.92, 0.8, 0.6 or 0.5.

6. The biaxial pivot mechanism of claim 3, wherein a tooth number of the first main gear is substantially greater than 12, a module of the first main gear is substantially greater than 0.2mm, and the tooth number multiplied by the module is a pitch circle diameter of the first main gear.

7. The biaxial pivot mechanism of claim 6, wherein a tooth crown of the first main gear is substantially greater than 0.2 mm, the pitch circle diameter and the twice tooth crown of the first main gear are added up to equal an outer diameter of the first main gear.

8. The biaxial pivot mechanism of claim 6, wherein the tooth number divided by the pitch circle diameter equals a diametral pitch of the first main gear.

9. The biaxial pivot mechanism of claim 8, wherein the tooth crown of the first main gear is substantially greater than 0.2 mm, and the tooth crown is a reciprocal value of the diametral pitch.

10. The biaxial pivot mechanism of claim 1, wherein a tooth number of the first transmission gear is substantially greater than 8, and a module of the first transmission gear is substantially greater than 0.2 mm.

11. The biaxial pivot mechanism of claim 1, wherein the gear ratio of the first main gear to the second main gear is 0.92, 0.8, 0.6 or 0.5.

12. The biaxial pivot mechanism of claim 1, wherein a tooth number of the first main gear is substantially greater than 12, a module of the first main gear is substantially greater than 0.2 mm, and the tooth number multiplied by the module is a pitch circle diameter of the first main gear.

13. The biaxial pivot mechanism of claim 12, wherein a tooth crown of the first main gear is substantially greater than 0.2 mm, the pitch circle diameter and the twice tooth crown of the first main gear are added up to equal an outer diameter of the first main gear.

14. The biaxial pivot mechanism of claim 12, wherein the tooth number divided by the pitch circle diameter equals a diametral pitch of the first main gear.

15. The biaxial pivot mechanism of claim 14, wherein the tooth crown of the first main gear is substantially greater than 0.2 mm, and the tooth crown is a reciprocal value of the diametral pitch.

16. A portable electronic device comprising:
   a first casing;
   a second casing whereon the first casing is rotatably disposed; and
   a biaxial pivot mechanism disposed between the first casing and the second casing for rotating the first casing relative to the second casing, the biaxial pivot mechanism comprising:
      at least one fixing component, the fixing component comprising a first area and a second area;
      a first shaft disposed on the first area of the fixing component and connected to the first casing;
      a first main gear disposed on the first shaft in a coaxially rotary manner;
      a second shaft disposed on the second area of the fixing component and connected to the second casing;
      a second main gear disposed on the second shaft in a coaxially rotary manner, the first main gear and the second main gear having different numbers of teeth; and
      a transmission gear set engaged between the first main gear and the second main gear, wherein as the first main gear rotates at a first direction, the transmission gear set is driven by the first main gear to synchronously rotate the second main gear at a second direction opposite to the first direction, the transmission gear set comprises a first transmission gear and a second transmission gear having same tooth numbers and same modules, the first transmission gear is engaged with the first main gear and the second transmission gear, the second transmission gear is engaged with the second main gear and the first transmission gear, wherein a center line connected between axial centers of the first main gear and the second main gear is not parallel to a normal vector of the second casing folded with the first casing, and an angle between the center line and the normal vector is varied according to a gear ratio of the first main gear to the second main gear.

17. The portable electronic device of claim 16, wherein the first casing rotates relative to the biaxial pivot mechanism at a predetermined direction, the biaxial pivot mechanism synchronously rotates the first casing relative to the second casing at the predetermined direction.

18. The portable electronic device of claim 16, further comprising:
   a connective cable, two ends of the connective cable being electrically connected to the first casing and the second casing respectively, the connective cable passing through a gap between the biaxial pivot mechanism and the first casing; and
   a protective component disposed on the biaxial pivot mechanism and the connective cable.

19. The portable electronic device of claim 16, wherein the biaxial pivot mechanism further comprises:
   a first supporter disposed on the first shaft and fixed to the first casing; and
   a second supporter disposed on the second shaft and fixed to the second casing.

20. The portable electronic device of claim 16, wherein the first transmission gear rotates at the second direction and the second transmission gear rotates at the first direction when the first main gear rotates at the first direction.

21. The portable electronic device of claim 16, wherein the biaxial pivot mechanism further comprises:
   a plurality of torsional components disposed on the first shaft;
   a constraint component disposed on the first shaft to press the plurality of torsional components; and
   a plurality of buffers disposed between the first main gear and the fixing component, between the torsional component and the fixing component, and between the torsional component and the constraint component.

22. The portable electronic device of claim 16, wherein a tooth number of the first main gear is substantially greater than 12, a module of the first main gear is substantially greater than 0.2 mm, and the tooth number multiplied by the module is a pitch circle diameter of the first main gear.

23. The portable electronic device of claim 22, wherein a tooth crown of the first main gear is substantially greater than 0.2 mm, the pitch circle diameter and the twice tooth crown of the first main gear are added up to equal an outer diameter of the first main gear.

24. The portable electronic device of claim 22, wherein the tooth number divided by the pitch circle diameter equals a diametral pitch of the first main gear.

25. The portable electronic device of claim 24, wherein the tooth crown of the first main gear is substantially greater than 0.2 mm, and the tooth crown is a reciprocal value of the diametral pitch.

26. The portable electronic device of claim 16, wherein a tooth number of the first transmission gear is substantially greater than 8, and a module of the first transmission gear is substantially greater than 0.2 mm.

27. The portable electronic device of claim 16, wherein the gear ratio of the first main gear to the second main gear is 0.8, and the angle between the center line and the normal vector is substantially 10 degrees.

28. The portable electronic device of claim 16, wherein the gear ratio of the first main gear to the second main gear is 0.6, and the angle between the center line and the normal vector of the second casing is substantially 22.5 degrees.

29. The portable electronic device of claim 16, wherein the gear ratio of the first main gear to the second main gear is 0.5, and the angle between the center line and the normal vector of the second casing is 30 degrees.

30. The portable electronic device of claim 16, wherein the gear ratio of the first main gear to the second main gear is 0.92, and the angle between the center line and the normal vector of the second casing is substantially 3.75 degrees.

31. The portable electronic device of claim 16, wherein the portable electronic device further comprises a magnetic sensor disposed on the first casing or the second casing, the biaxial pivot mechanism further comprises a magnetic component disposed on the fixing component and adjacent to the magnetic sensor, relative position of the magnetic component and the magnetic sensor is varied by rotation of the first casing, the magnetic sensor is utilized to induce magnetic flux intensity generated from the magnetic component and outputs a switching signal according to the magnetic flux intensity.

32. The portable electronic device of claim 31, wherein an automatic rotary function of a display surface of the second casing is shut down and an operational function of an input interface of the second casing is actuated by the switching signal when the magnetic sensor determines the magnetic flux intensity is greater than a threshold, the automatic rotary function of the display surface is actuated and the operational function of the input interface is shut down by the switching signal when the magnetic sensor determines the magnetic flux intensity is smaller than the threshold.

33. The portable electronic device of claim 31, wherein the magnetic component comprises a first pole and a second pole opposite to each other, the magnetic component rotates relative to the magnetic sensor via the second pole to vary relative distance between the first pole and the magnetic sensor.

34. The portable electronic device of claim 31, wherein the magnetic component comprises a first pole and a second pole opposite to each other, the magnetic component rotates via a boundary between the first pole and the second pole, and the magnetic flux intensity induced by the magnetic sensor is varied according to rotary angle of the magnetic component.

* * * * *